US009365064B2

(12) United States Patent
Tiessen et al.

(10) Patent No.: US 9,365,064 B2
(45) Date of Patent: Jun. 14, 2016

(54) WET-TRAPPING OF ENERGY CURABLE FLEXOGRAPHIC INKS AND COATINGS

(75) Inventors: John Gerard Tiessen, Elk Grove Village, IL (US); Terry Best, Newark, NJ (US); Juanita Parris, Montvale, NJ (US); Xiang Jun Liu, Elmhurst, IL (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 104 days.

(21) Appl. No.: 13/574,450

(22) PCT Filed: Jan. 24, 2011

(86) PCT No.: PCT/US2011/022259
§ 371 (c)(1),
(2), (4) Date: Aug. 21, 2012

(87) PCT Pub. No.: WO2011/091364
PCT Pub. Date: Jul. 28, 2011

(65) Prior Publication Data
US 2012/0304879 A1 Dec. 6, 2012

Related U.S. Application Data

(60) Provisional application No. 61/297,312, filed on Jan. 22, 2010.

(51) Int. Cl.
*B41M 1/18* (2006.01)
*B41M 1/06* (2006.01)
(Continued)

(52) U.S. Cl.
CPC . *B41M 1/18* (2013.01); *B41M 1/06* (2013.01); *C09D 11/101* (2013.01); *B41M 7/0072* (2013.01)

(58) Field of Classification Search
CPC .......... B41M 1/18; B41M 3/008; B41M 1/14; B41M 7/00
USPC ....................................... 101/490
See application file for complete search history.

(56) References Cited

U.S. PATENT DOCUMENTS 3,607,813 A 9/1971 Purcell et al.
4,035,214 A * 7/1977 Shuppert et al. .............. 101/211
(Continued)

FOREIGN PATENT DOCUMENTS

JP 2003-270860 A 9/2003
JP 2006-501077 A 1/2006

OTHER PUBLICATIONS

Extended European Search Report issued on Nov. 4, 2013 in connection with European Patent Application No. 11735310.2.
(Continued)

*Primary Examiner* — Jill Culler
(74) *Attorney, Agent, or Firm* — Charles C. Achkar; Ostrolenk Faber LLP

(57) ABSTRACT

Methods and apparatus for flexographic color printing, and more particularly for implementing "wet trapping" in flexographic printing using energy curable flexographic liquid inks are presented. Radiation curable inks can be formulated that wet trap over each other without back-trapping onto the plates and anilox units of down-line printing units by controlling the storage modulus of the ink/coating. The storage modulus G' in the inks can be controlled to ensure that the highest G' ink is printed 1st down with successive colors being trapped in the order of their (declining) G' values. An image in wet ink can thus be trapped over a different image in wet ink of a different color without picking the 1st ink back up and redepositing it onto the subsequent plates and rollers in the printing press (back-trapping).

19 Claims, 4 Drawing Sheets

(51) Int. Cl.
*C09D 11/101* (2014.01)
*B41M 7/00* (2006.01)

(56) References Cited

U.S. PATENT DOCUMENTS

| | | | |
|---|---|---|---|
| 4,088,891 A | | 5/1978 | Smith et al. |
| 4,241,657 A | * | 12/1980 | Fujimori ........................ 101/211 |
| 4,479,429 A | * | 10/1984 | Haryu ........................... 101/40.1 |
| 5,126,221 A | * | 6/1992 | Chiba et al. ................. 430/107.1 |
| 5,690,028 A | | 11/1997 | Schick |
| 6,772,683 B2 | | 8/2004 | Laksin et al. |
| 7,267,055 B2 | | 9/2007 | Weiss et al. |
| 7,416,826 B2 | | 8/2008 | Nakamura et al. |
| 2007/0046963 A1 | | 3/2007 | Nagase et al. |
| 2007/0245916 A1 | | 10/2007 | Bird et al. |
| 2007/0289459 A1 | | 12/2007 | Laksin |
| 2009/0301331 A1 | | 12/2009 | Laksin et al. |
| 2011/0081608 A1 | * | 4/2011 | Yaguchi et al. ................ 399/223 |

OTHER PUBLICATIONS

Japanese Office Action issued in Japanese Application No. 2012-550194 dated Dec. 15, 2015 (with English Language Translation).

* cited by examiner

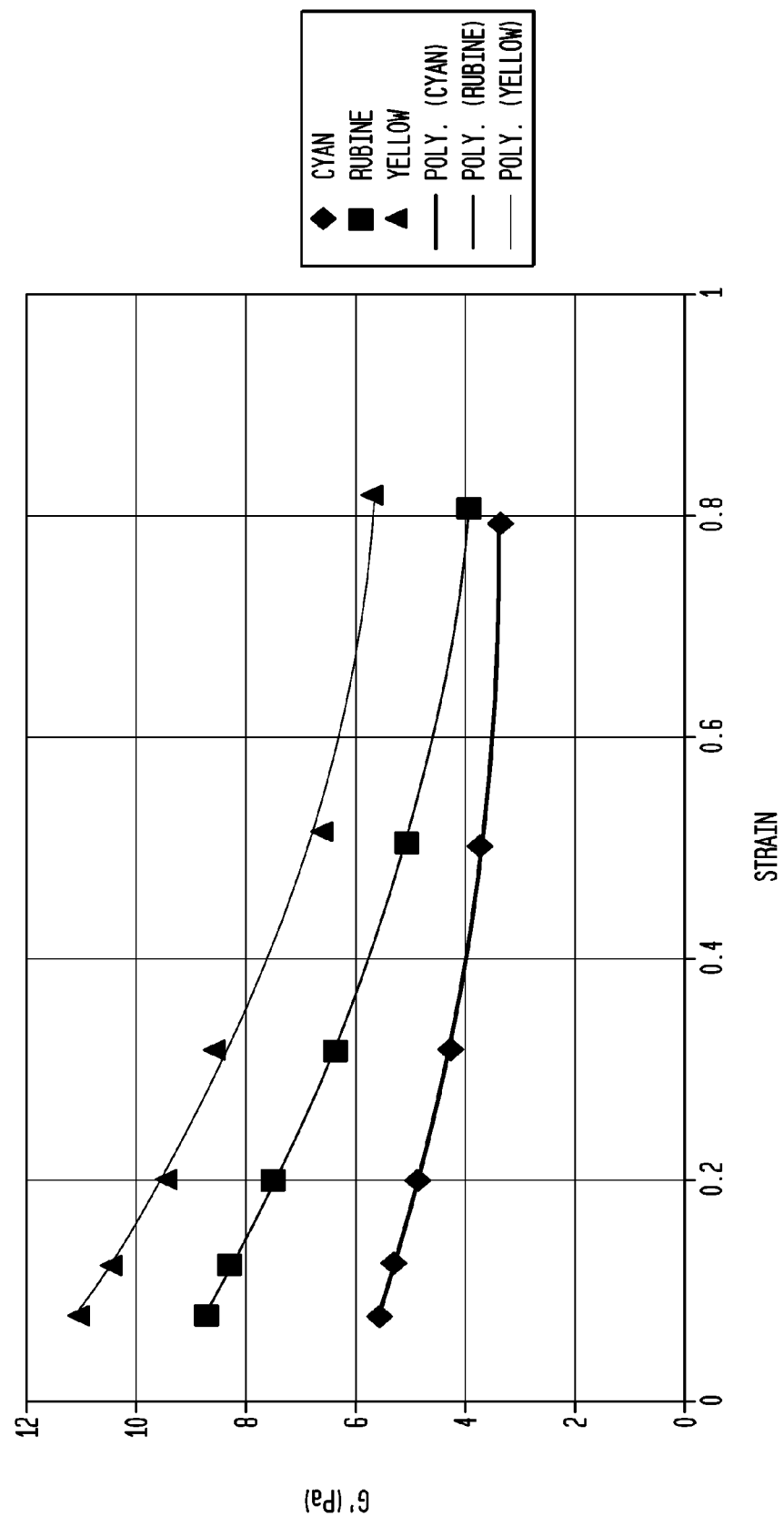

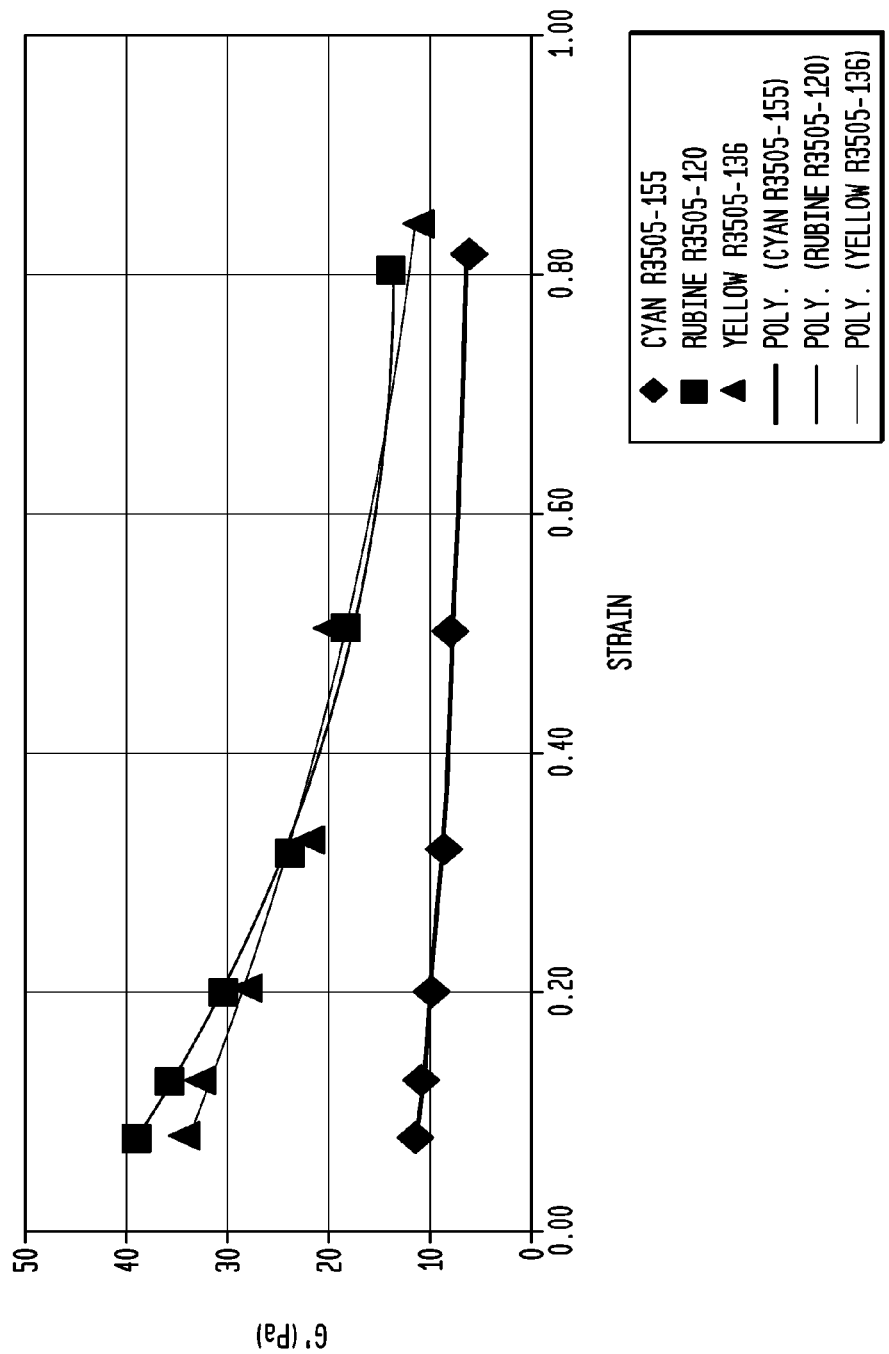

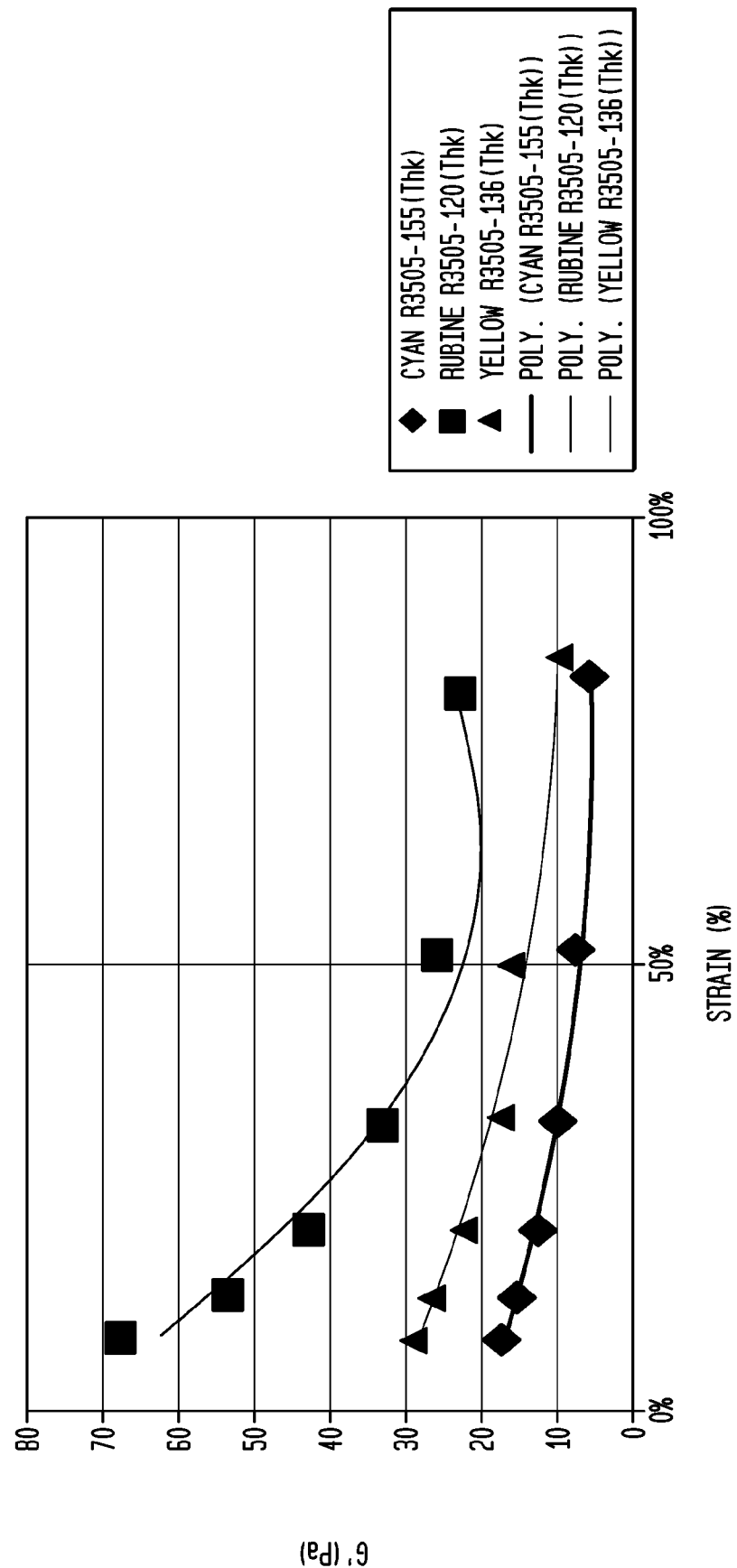

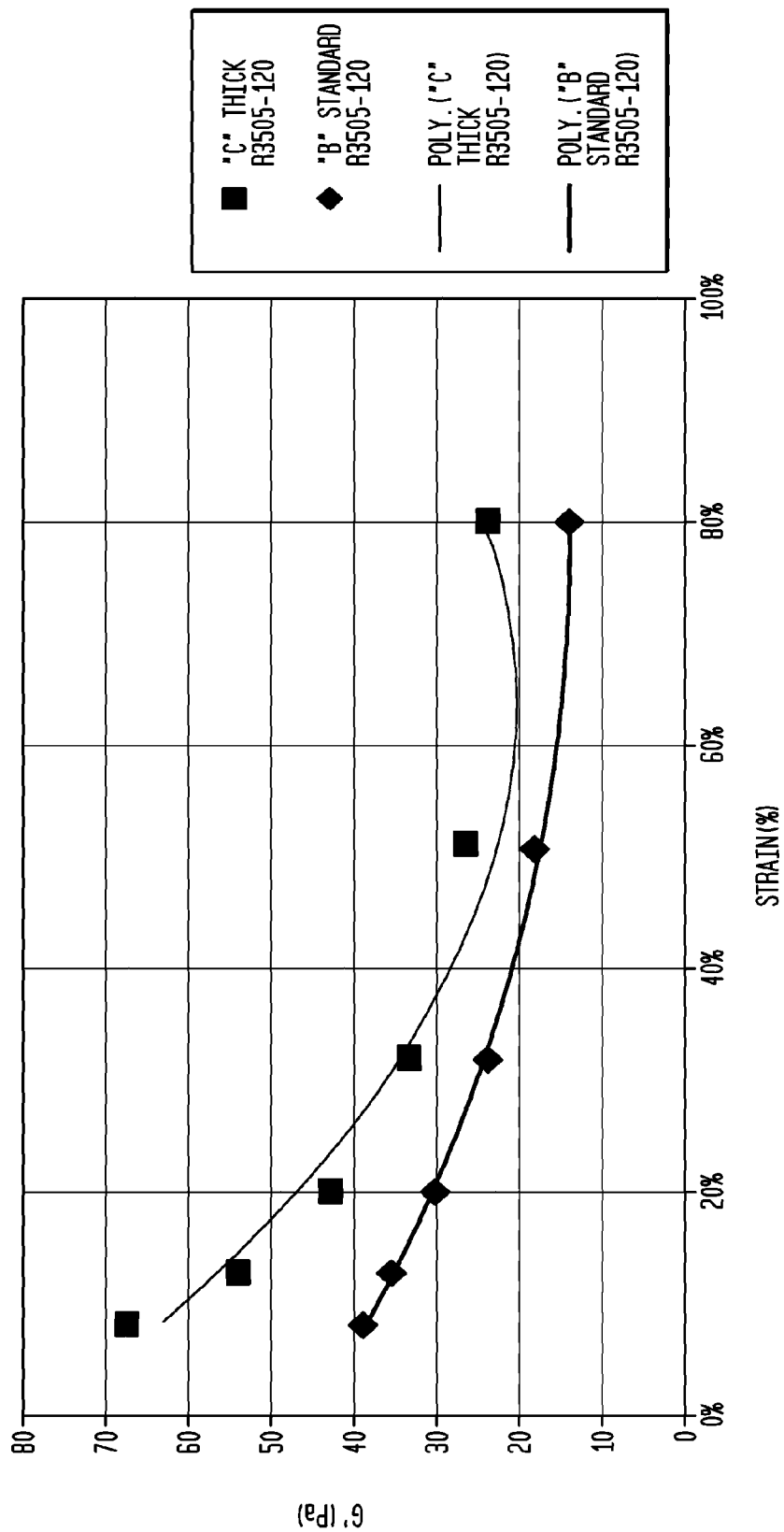

WET-TRAPPING OF ENERGY CURABLE FLEXOGRAPHIC INKS AND COATINGS

CROSS-REFERENCE TO RELATED APPLICATIONS

The present application is a 35 U.S.C. 371 National Stage Entry of International Application No. PCT/US2011/022259, filed Jan. 24, 2011, which claims priority to U.S. Provisional Patent Application No. 61/297,312, filed on Jan. 22, 2010, the disclosure of which is hereby incorporated herein by reference.

BACKGROUND OF THE INVENTION

Multicolor printing processes typically require the sequential printing of a plurality of superposed single color ink layers. When high quality image reproduction is desired, it is important to avoid a previously applied ink layer mixing with a subsequently applied ink layer. Such layer mixing typically results in undesirable color rendition.

This problem has been addressed in a number of different ways. The simplest way to prevent undesirable color mixing is to dry each applied ink layer prior to the application of a superposed next ink layer. However, this method suffers a major disadvantage, in that it requires complete drying after applying each ink layer. Drying takes time and energy to accomplish, and, as a result, productivity is reduced and production costs increase.

In an effort to speed up the printing process, wet trapping was developed. Wet trapping is a process whereby the ink layer deposited or applied at each inking station is not dried before the next ink layer is deposited thereover to produce a coloristic or visual effect. To implement wet trapping, it is important that the tack characteristics of the superposed ink layers be different.

Wet trapping is not a serious problem in offset printing, because the viscosity of the inks used in offset printing, ranges from 20,000 to 100,000 cps. Such high viscosity inks exhibit a wide range of tack characteristics that can be used to effect wet trapping without the need to dry the ink layers between inking stations.

In recent years, a form of printing that permits printing on various kinds of substrates, varying from cardboard to polyethylene to metal, has become widely accepted. This printing method is known as flexography.

Flexography employs a resilient printing plate having raised portions, which are coated with an ink and pressed against a substrate to transfer the ink to the substrate. In flexography, ink is transferred from a reservoir to the printing plate's raised surface through an intermediate transfer roll known in the art as an anilox roll. The anilox roll surface is covered by a plurality of tiny ink wells that fill with ink from the reservoir and transfer it to the flexographic printing plate. Obviously high quality printing requires that the flexographic printing plate surface be inked uniformly and consistently. This in turn requires that the anilox roll cells be small and that all of the anilox cells be filled each time with ink from the reservoir to substantially the same level.

Such requirement poses limitations on the fluidity or viscosity of the ink. A viscous ink will not be picked up as uniformly or consistently by the anilox roll and the flexographic printing plate surface will not be inked uniformly. The result has been that inks suitable for flexographic applications typically have viscosities under 2,000 cps, preferably less than 400 cps.

Current regulations regarding solvent emissions have resulted in the development of inks suitable for use in flexography that are energy curable. Such inks contain little or no solvent, and are fixed to the substrate not by drying but by curing via actinic radiation, such as ultraviolet light or electron beam. Their tack is very low and cannot be adequately measured with conventional instruments. Their viscosities are in the range of about 30 to 50 cps. While such viscosity range results in superior flexographic printing, energy-curable inks for flexographic applications exhibit very low tack, cannot be tack rated, and need be to cured between inking stations to prevent back transfer and mixing from the printed ink on the substrate to the inking rolls of subsequent stations. Such inter-station curing is expensive, as it requires substantial equipment modification. Such curing is also undesirable from a manufacturing stand point, as it increases the time required between the deposition of a subsequent ink layer in order to allow for curing of the previously deposited ink layer, thereby slowing down the printing process.

Wet trapping has also been proposed in flexographic printing based on the recognition that when depositing superposed multiple layers of ink, mixing will not occur if each layer is deposited over a layer having a higher viscosity than the newly deposited layer. The highest viscosity layer traps, so to speak, the second layer without mixing with or transfer of the underlying layer. However, with the range of viscosities available for flexographic printing inks, it is impractical to implement wet trapping using constantly decreasing ink viscosities for each layer that are sufficiently different from each previously applied layer viscosity in order to effect wet trapping, particularly as the number of applied layers increases. In essence, one runs out of available ink viscosities to implement wet trapping.

U.S. Pat. No. 5,690,028 attempts to solve the above mentioned problem of limited available ink viscosity range using a method of wet trapping in a multicolor printing application using energy curable inks. However, here the energy curable inks are heated before being applied to a substrate, and are applied to the substrate at a temperature that is higher than the previously applied ink layer. Because the temperature of the previously applied ink layer on the substrate is cooler than the heated ink, the viscosity of the previously applied ink layer is lower than the viscosity of the applied ink. This viscosity differential causes the lower viscosity ink to unilaterally transfer onto the higher viscosity ink and prevents both back trapping and ink blending. This method requires substantial modification to existing printing press equipment to provide for heating units in each inking station before the ink is applied to the substrate. Moreover, as the number of stations increases, so must the ink temperature in the successive inking stations. Thus, it may be necessary to apply cooling to the substrate, or the printing speed may have to be reduced, in order to prevent having to increase the ink temperature to levels that may adversely affect its properties.

U.S. Pat. No. 6,772,683 describes a method for flexographic printing of multiple superposed ink layers on a substrate without prior curing of the earlier printed inks. The method involves applying onto a substrate ink layers having a non reactive diluent, and then evaporating at least a portion of the non-reactive diluent in the applied ink layer, thereby increasing the viscosity of the applied ink layer. Then a subsequent ink layer is applied. The previous layer, as a result of the evaporation of the diluents, has an increased viscosity. Thus the newly applied ink layer has a viscosity lower than the increased viscosity of the previously applied ink layer.

Similarly, U.S. Pat. No. 6,772,682 describes a process whereby wet trapping of Energy Curable (Ultraviolet or Electron Beam) inks can be achieved by loss of a fugitive diluent (water) present at levels from 5% to 50%. The loss of a small amount of water in an EB flexo ink can cause a many-fold rise in viscosity. This causes printing process instability.

U.S. Pat. No. 7,329,438 describes how to make a wet coating printed over wet (or dry) ink smoother (higher gloss) through the application of roller pressure from a mirror surface roller with very low surface tension. However, it does not teach how to make the wet coating trap over the wet ink in the first place.

United States Patent Application 2007/0289459 describes overcoming the need for a fugitive solvent in an EB flexo system by partially curing the first down ink before the $2^{nd}$ down ink is trapped over it. This, of course, requires an intermediate curing mechanism.

United States Patent Application 2010/0242757 further extends radiation curable (EB) wet trapping methods for printing inks to the gravure printing technology. It features inks that are dried/cured by ovens or IR heaters and are hard enough to pass between printing decks without being marred by turn bars or other face contact point. However, this disclosure still relies on a fugitive solvent to achieve wet trapping, which involves unnecessary complexity.

A solvent-free and water-free wet trapping technique would provide a novel solution to wet-on-wet printing of energy curable liquid inks that does not require partial inter-station cure or full inter-station cure with actinic radiation. A printing technique that does not require the addition of a volatile, evaporating component to achieve the viscosity differential required for wet trapping could have commercial viability as a more "foolproof" printing application technology. Such a technique would avoid the logistical and technical challenges of providing an ink that is stable over a range of printing and evaporation conditions, as well as over a sufficiently broad water content range.

SUMMARY OF THE INVENTION

Methods and apparatus for flexographic color printing, and more particularly for implementing "wet trapping" in flexographic printing using energy curable flexographic liquid inks are presented. Radiation curable inks can be formulated that wet trap over each other without back-trapping onto the plates and anilox units of down-line printing units by controlling the storage modulus of the ink/coating. The storage modulus G' in the inks can be controlled to ensure that the highest G' ink is printed $1^{st}$ down with successive colors being trapped in the order of their (declining) G' values. An image in wet ink can thus be trapped over a different image in wet ink of a different color without picking the $1^{st}$ ink back up and redepositing it onto the subsequent plates and rollers in the printing press (back-trapping). Sufficient separation in G' values of each color must be maintained across the entire range of strain values from 20% to 50%, for example, or in the range of 10% to 65%, for example, as measured via a controlled strain method using a cone-and-plate rheometer in oscillatory mode. In exemplary embodiments of the present invention, G' separation values of as little as 1.0 Pascal color-to-color, for example, can be sufficient to ensure good trapping so long as that degree of separation is maintained across the strain range of from 20% to 50%, or for example, 10% to 65%.

BRIEF DESCRIPTION OF THE DRAWINGS

FIG. 1 is a plot of G' (elastic modulus) vs. increasing Strain for the three exemplary inks as described in Example 1;

FIG. 2 is a plot of G' (elastic modulus) vs. increasing Strain for the three exemplary inks as described in Example 2;

FIG. 3 is a plot of G' (elastic modulus) vs. increasing Strain for the three exemplary inks as described in Example 3; and FIG. 4 is a comparison plot of G' (elastic modulus) vs. increasing Strain for two magenta inks, being the Magenta B from Example 2 and its thickened version, the Magenta C from Example 3, said comparison as described in Example 9.

DETAILED DESCRIPTION OF THE INVENTION

In exemplary embodiments of the present invention, wet trapping can be achieved by applying successive ink layers of an energy curable flexographic liquid ink, preferably a UV curable ink, and then simultaneously curing the applied ink layers with actinic radiation.

As noted above, conventionally, the tack and viscosity gradient required to achieve this differential could only be achieved with paste inks in lithographic printing. Subsequently, wet trapping by evaporation of water or solvent contained in liquid inks was used, with all of its drawbacks. Solving these prior art problems, in exemplary embodiments of the present invention, using a novel analysis of the relevant ink property, neither water nor any other volatile component in the ink is required to achieve wet trapping.

Thus, methods are presented for formulating an energy curable ink (UV or EB) that wet traps cleanly without the use of fugitive diluents. The methodology is based on rheological measurements that are equally applicable to high or low viscosity inks (or coatings). As explained below, in exemplary embodiments of the present invention, a pseudoplastic fluid flow characteristic that is responsible for successful wet trapping is shear thinning, and such mechanism is the same for paste and liquid inks. Thus, conventional measurements of the viscosity of materials are not helpful in making a correct prediction.

Wet trapping of one liquid layer over another revolves ultimately around factors influencing the transfer of ink (or coating) from one surface to another. It has long been thought that either differences in viscosity or surface energy were responsible for these effects. Regarding surface energy, it has recently been demonstrated for UV coatings that " . . . the chemical interactions between the fluid and the substrate surface have no influence or minimal influence on the absorption rate when an external pressure is applied. In addition, the results suggest that forced wetting cannot be well-described by contact angle measurements." (M. Pykönen et. al. Ind. Eng. Chem. Res. 2010, 49, 2169-2175). The present invention requires no such considerations and is aligned with Pykönen's conclusion.

The most common method currently used for measuring the ability of an ink to wet trap on top of another (regardless of ink type) is International Standard ISO 12634. This method does not measure the inherent properties of inks (or coatings) and is recognized as such within the standard. Quoting from the introduction to ISO 12634; "The tack cannot be regarded as a material property that can be derived from basic physical phenomena." As described below, in exemplary embodiments of the present invention a quantitative measurement of true physical properties of inks (or coatings) can be used, and can be done at low shear rates where it is equally applicable to thin or thick fluids (either liquid ink or paste ink) and is thus superior.

A recent paper investigating the performance of web offset heatset and conventional sheetfed (paste) inks sums up the current understanding of those skilled in the art by describing the situation as follows: "The viscosity of the ink does not explain the differences in the tack results. It is difficult to predict the range of shear rates that the ink experiences in a printing process or during a tack test; however, there is radial flow in a thin film layer that can generate high shear rates." (Hanna Koivula et. al.; Ind. Eng. Chem. Res. 2010, 49, 4676-4681). As described below, using the techniques of various embodiments of the present invention, ink trapping performance can be predicted NOT by measuring the "high shear rate" range (typically thought to encompass viscosities measured at shear rates significantly higher than $100\ s^{-1}$); but rather by measuring rheology characteristics in a strain range from 20% to 50%, for example, or 10%-65%, for example, or even 10% to 125%. This is both more practical and more correct scientifically.

A. Color Trapping Theory

In exemplary embodiments of the present invention, non-evaporative wet trapping is effected by applying successive layers of energy curable liquid inks that do not contain any intentionally added volatile components. The degree of wet trapping of the applied ink layers can be quantified as a function of the color density of each individual ink layer and the overall color density of the multilayered ink. When wet trapping is successfully achieved, the applied ink layers do not mix, but rather remain as distinct layers that are effectively transferred from blanket or plate to substrate.

For a multilayer ink application, trapping efficiency can be described as follows:

$$\%\ Trapping = 100 \times [D_R/(D_Y+D_M)]$$

Where:
$D_R$=color density of multilayer ink application;
$D_Y$=color density of ink application Y; and
$D_M$=color density of ink application M.

Normally, trapping is less than 100%, and trapping levels above 80% are considered to be sufficiently robust for industrial printing applications. Trapping efficiencies at levels over 60% are sufficiently viable to warrant further optimization of ink rheology and viscosity to achieve trapping efficiencies close to or greater than 80%.

B. Definition of Correct Rheological Properties to Measure for Predicting Wet Transfer In recent press trials, developmental yellow, magenta and cyan flexographic printing inks were shown to wet trap effectively when yellow was printed first down, magenta second and cyan third. In each case the press ran for several thousands of feet with no back-trapping. In a subsequent press trial using inks modified from those used in the initial two trials, the press began printing without back-trapping, but a situation where the trap quality began to deteriorate developed after several thousand feet of substrate had been printed. This demonstrated the boundary limit of the ink's rheological properties at which effective wet trapping can occur. Very recently a methodology using flexo hand-proofers on the lab bench was developed showing the same trapping trends in the same color trap orders as those seen on press; thereby confirming the validity of the data gathered to date, and showing that the techniques of the present invention are a property of the ink/coating itself and not the tooling used to generate the color traps.

In rheological practice, the shear modulus can be described as the ratio of shear stress to shear strain:

$$G = \tau_{(xy)}/\gamma_{(xy)} = (F/A)/(\Delta X/I) = (Shear\ Stress)/(Shear\ Strain)$$

Where:
F=the force which acts on an area;
A=the area that the force acts over;
$\Delta X$=Transverse displacement; and
I=Initial Length.

In practice, the Complex Dynamic Modulus, G, for a visco-elastic fluid can be measured using a cone and plate rheometer in oscillation. In this context it is noted that (i) purely elastic materials have stress and strain in phase, so that the response of one caused by the other is immediate; (ii) in purely viscous materials, strain lags stress by a 90 degree phase lag; and (iii) viscoelastic materials exhibit behavior somewhere in the middle of these two types of material, exhibiting some lag in strain.

These relationships are described by the following equations:

$$Storage\ Modulus,\ G' = \{\sigma_o \cos(\delta)\}/\in_o$$

(G' is associated with the elastic energy in the fluid)

$$Loss\ Modulus,\ G'' = \{\sigma_o \sin(\delta)\}/\in_o$$

(G" is associated with the viscous energy or dissipative energy loss of the fluid)

Where:
$\sigma_o$=amplitude of the stress;
$\in_o$=amplitude of the strain; and
$\delta$=phase angle between them.

This general relationship of the component moduli to the complex dynamic modulus G, is of the form:

$$G = G' + iG'';\ where\ (i)^2 = -1$$

However, for the situation where the shear applied to the fluid is oscillatory in nature, this becomes:

$$Absolute\ Shear\ Modulus\ (G)^2 = (G')^2 + (G'')\ or$$

$$|G| = \{(G')^2 + (G'')^2\}^{(1/2)}$$

The quantity |G| is sometimes also known as TB or "Total Body". It is the quantity most closely related to the more commonly understood measurement known as Viscosity. Viscosity is commonly defined as the Shear Stress divided by the velocity gradient of the fluid perpendicular to its direction of flow.

$$Viscosity = \mu = \tau/(du/dy)$$

While analagous to the Stress/Strain relationship for G, the Viscosity $\mu$ is not the same. Except for Newtonian fluids where du/dy=1.0, the du/dy relationship is constantly changing as the shear force changes. Thus, separating the storage (elastic) properties of the fluid from the loss (viscous/energy dissipative) properties becomes extremely difficult if not impossible. Most visco-elastic measurements used in the art are of a "controlled shear" nature, and thus are of little value in determining the differences between forces that act such as the forces relevant to a fluid being transferred from one surface to another perpendicular to the planar orientation of that surface.

Exemplary embodiments of the present invention are based on the insight that only G' (the storage modulus) is capable of predicting fluid flow perpendicular to the surface of the fluid(s), such as, for example, an ink or coating transferring from one "planar" surface to another "planar" surface. This is because only G' describes the cohesion of the fluid as it builds up or releases energy mechanically (much as does a spring). The dissipative energy represented by G" (the viscous modulus) is lost as heat, is not mechanically stored within the fluid, and thus cannot aid in transferring the fluid from one surface to another. Hence only an instrument operating in a controlled strain methodology can generate the necessary data needed for making the correct predictions regarding wet trapping ability of an ink or coating.

C. Relevant Region of Strain for Measuring G' when Predicting Wet Trapping

Most theories of flexographic printing have heretofore assumed that Newtonian flow is ideal for the flexographic process. However, there are very few flexographic inks that can actually be defined as Newtonian in the extremely low shear process used for transferring ink from an anilox to a plate or from a plate to a substrate.

The ideal situation for flexographic printing is known as a "kiss" impression—i.e., a situation where the plate just barely touches the substrate. Dot deformation, plate bounce, halos around dots, hard edges on solids and a host of other ills are assumed to be avoided when using a "kiss" impression. Light impression of this type is often sufficient to trap dots of one color of ink over another in the case of process printing. Generally, more pressure needs to be exerted to achieve the same effect when printing solids. In either case, a common solution in practice to address "back-trapping" issues is for the press operator to apply more pressure; either between plate and anilox or between plate and substrate. It should be noted, however, that this is generally considered an "unskilled" response and has traditionally been discouraged in flexo education. The preferred methodology taught in the art by schools, text books, professional association guidelines, etc. is to make changes to the plates, inks, substrates and mounting tapes such that a "kiss impression" will properly reproduce the desired art work.

Contrary to popular belief, the release of ink in flexographic printing from the printing plate to the surface being printed is not a high shear process. It cannot be, because the plate and anilox, as well as the plate and the printed surface, are all moving with exactly the same surface speed. There is no differential movement of the inked surfaces relative to each other, neither in the plane of the machine direction nor in the plane of the cross machine direction. Where then does the shear come from that is thought to occur?

The only shear that the ink is subjected to is actually the shear it experiences in the direction perpendicular to the 'flat' surfaces of the rollers. In other words, all transfer forces on the inks are expressed orthogonal to both the machine direction and the cross-machine direction of the printing/coating equipment. This being the case, the entire amount of shear that the ink is subjected to can be described by its being compressed on its way into the nip of the printing unit and then extended on its way out until it breaks with a portion remaining on each surface. (The notion that this process is high shear probably comes from the knowledge that the metering of ink via a doctor blade into the cells of the anilox roller is a high shear process. However, the actual transfer of ink from anilox to plate to printed surface is not a high shear process.)

This situation is easiest to visualize and understand in the case of process printing. A situation can be considered, for example, where the printer is printing a 50% dot, which is defined as a dot covering 50% of the surface area of its grid. It is further assumed in this example that the grid is 133 lines per inch. In this case:

Grid Dimension: 191.0 µm×191.0 µm;
Grid Area: 36,481 µm²
50% Dot Area: 36,481 µm²×0.50=18,240 µm²
50% Dot Diameter: D=152.4 µm When the dot is printed, it is "squashed" by the contact between the plate and the substrate. In common terminology, the dot gain is the ratio of the increase in the size of the dot vs. the theoretical dot area that would have been printed if the dot was exactly the same size as the dot on the plate. Assuming a 10% dot gain:

60% Dot Area: 36,481 µm²×0.60=21,889 µm²
60% Dot Diameter: D=166.9 µm

Assuming that the ideal dot was 2.0 µm thick, and further assuming that the same volume of ink transfers regardless of the dot gain, and that the dot is just smashed "flatter" if the dot gain is higher, we can calculate the most extreme case to determine how much shear strain is involved in transferring the ink from the plate to the substrate.

50% Dot Volume=18,240 µm²×2.0 µm=36,481 µm³=60% Dot Volume
60% Dot Thickness=36,481 µm³/21,889 µm²=1.67 µm This yields the strain relationships for a 10% dot gain on a 50% dot.

$$\text{Strain}_{(thickness)} = (2.0-1.67)/2.0 = 16.5\%$$

$$\text{Strain}_{(radial)} = (166.9-152.4)/152.4 = 9.5\%$$

The actual movement of the average ink particle representing the overall strain of the system can be represented by a right triangle, where the total strain is the hypoteneuse and the orthogonal vectors as the two legs.

$$\text{Strain(total)} = \{\text{Strain}_{(thickness)}^2 + \text{Strain}_{(radial)}^2\}^{(1/2)} = 19.2\%$$

Using this series of calculations, a table of values relevant to dot gains at the 50% level was established. Typically, the largest mismatch between dot gain and theoretical dot size occurs in this region, so it is a good estimate of the highest amount of strain that needs to be considered in evaluating the transfer of ink from one surface to another.

| Theoretical Dot Gain | Theoretical Strain Rate |
| --- | --- |
| 10% | 19.20% |
| 15% | 27.0% |
| 20% | 33.9% |
| 25% | 40.2% |
| 30% | 45.9% |
| 35% | 51.2% |
| 40% | 56.1% |

As most high quality printing occurs with nominal dot gains from 15% to 30%, a theoretical strain range from 10% to 65% will cover all process printing situations of commercial interest. While more difficult to quantify, trapping tests on the lab bench seem to indicate that this range is also the one of interest relevant to solid traps.

D. Specification of G' Gap Necessary for EC Flexo Wet Trapping

It is necessary to print Energy Curbale ("EC") flexographic inks with the highest G' value first down in printing sequence. In exemplary embodiments of the present invention, for a reliably clean trap to occur, the value of G' of the first ink printed should exceed that of the next ink by at least 1.0 Pascals at every point along the G' vs. Strain curve, from a Strain value of 10% to a Strain value of 65%.

If the first down ink is lower in G' than the ink printed over it, then the overprinted ink can be shown to pick that first down ink back up, thus contaminating the roller and the anilox with it. If the G' values of the inks cross at some point along the range of Strain values from 10% to 65%, then it is unlikely that a good trap will result. In such a case there will always be some backtrapping depending on differing local levels of shear to the inks of one color into the other regardless of trap order. Although one sequence may well be much better than the other, it should not be assumed that the press can be so finely manipulated as to always stay out of the range of problematic traps. Thus, it is better to separate the G' values of the inks by a larger amount in such a case.

E. Modifying G' Values of Ink Formulas in Exemplary Embodiments of the Present Invention—Ink Components As is clear from the above discussion, the best method—and really the only accurate measurement—to predict trapping behavior of inks is calculation of the G' value for each ink, and making sure there is a sufficient drop in G' value between each pair of successive inks to insure reliably clean trapping. As noted, in exemplary embodiments of the present invention, a 1.0 Pascal drop at every point along the G' vs. Strain curve, from a strain value of 10% to a strain value of 65% is advised.

Satisfying this G' drop requirement can often be accomplished by changing the G' value of inks. Thus, in exemplary embodiments of the present invention, addition of materials that impart pseudo-plastic behavior to EC inks can be effective at moving G' values higher. The most well known (though not the only) material exhibiting such behavior is fumed silica. Conversely, lowering solids levels in an ink, or using resins that exhibit less cohesive force, can also be effective at lowering G' values of inks. Thus, in exemplary embodiments of the present invention, materials (or combinations of materials) can be tested for their effect on G' and then added or removed as needed in order to maintain an optimal spacing of G' values between successive colors intended to be trapped.

1. Colorant/Pigment

The first component in such an ink is the colorant or pigment. Any suitable pigment can, for example, be used as long as the colorant is dispersible with the other composition components. Pigments can be, for example, organic, inorganic, metallic pigment, electrically conductive, magnetically active, a nanopigment, a dielectric pigment, a light absorbing pigment, or any and various combinations thereof. Examples of suitable pigments include monoazo yellows, monoarylide yellows, diarylide yellows, naphthol reds, rubine reds, lithol rubines, phtalocyanine blues, and carbon black. Some suitable pigments include, for example, Pigment Yellow 1, Pigment Yellow 3, Pigment Yellow 11, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 57:1, Pigment Red 112, Pigment Red 170, Pigment Red 210, Pigment Red 238, Pigment Red 269, Pigment Blue 15, Pigment Blue 15:1, Pigment Blue 15:2, Pigment Blue 15:3, Pigment Blue 15:4, Pigment Green 7, Pigment Green 36, Pigment violet 23, and Pigment Black 7, and the like, or combinations thereof.

Details of these pigments can be found, for example, in the NPIRI Raw Materials Data Handbook, Volume 4, Pigments (2nd Edition).

2. Energy Curable Component

In exemplary embodiments of the present invention, the second component of such an ink is the energy curable component. This can comprise, for example, an unsaturated oligomer or an ethylenically unsaturated polymer which is polymerizable or crosslinkable by the application of sufficient electron beam radiation. Such ethylenically unsaturated monomers, ethylenically unsaturated oligomers or ethylenically unsaturated polymers can include, for example, an acrylate, a methacrylate, an epoxy, a rosin ester, a hydrocarbon resin, a vinyl compound, a polyvinyl pyrrolidone compound, a polyvinyl pyrrolidone containing copolymer, a styrene maleic anhydride compound, a urethane compound, or combinations thereof. Useful ethylenically unsaturated compounds can include, for example, an ethylenically unsaturated monomer, ethylenically unsaturated oligomer or ethylenically unsaturated polymer.

In exemplary embodiments of the present invention, preferred ethylenically unsaturated compounds can include, for example, an acrylate, methacrylate, epoxy, rosin ester, hydrocarbon resin, vinyl compound, polyvinyl pyrrolidone compound, polyvinyl pyrrolidone containing copolymer, styrene maleic anhydride compound, urethane compound, or combinations thereof. These can include, for example, epoxy acrylates, polyether acrylates, polyurethane acrylates, polyester acrylates, and ethoxylated or propoxylated di- or multi-functional acrylates. Among the materials which may be used are polyfunctional terminally unsaturated organic compounds including the polyesters of ethylenically unsaturated acids such as acrylic acid and methacrylic acid and a polyhydric alcohol. Examples of some of these polyfunctional compounds are the polyacrylates and polymethacrylates of trimethylolpropane, pentaerythritol, dipentaerythritol, ethylene glycol, triethylene glycol, propylene glycol, glycerin, sorbitol, neopentylglycol, 1,6-hexanediol and hydroxy-terminated polyesters, hydroxy-terminated epoxy resins, and hydroxy-terminated polyurethanes. Also included in this group of terminally unsaturated organic compounds are polyallyl and polyvinyl compounds such as diallyl phthalate and tetraallyloxyethane and divinyl adipate, butane divinyl ether and divinylbenzene.

These may be further exemplified as acrylates of primary or polyhydric alcohol or oligoacrylates such as methyl acrylate, ethyl acrylate, propyl acrylate, butyl acrylate, hydroxyethyl acrylate, 2-ethylhexyl acrylate, ethylene glycol diacrylate, trimethylolpropane triacrylate, pentaerythritol triacrylate, epoxy acrylates, oligoester acrylates, urethane acrylates or the like. They may further be exemplified as methacrylates of primary or polyhydric alcohol such as methyl methacrylate, ethyl methacrylate, propyl methacrylate, butyl methacrylate, hydroxyethyl methacrylate, 2-ethylhexyl methacrylate, diethylene glycol dimethacrylate, trimethylolpropane trimethacrylate or the like, or allyl alcohol, diallyl ether, diallyl adipate, diallyl phthalate, both end diallylates of low molecular weight polyurethane or the like.

A preferred ethylenically unsaturated monomer, ethylenically unsaturated oligomer or ethylenically unsaturated polymer can be, for example, a water dispersible acrylate monomer or oligomer. A more preferred ethylenically unsaturated monomer, ethylenically unsaturated oligomer or ethylenically unsaturated polymer can comprise a urethane acrylate or an epoxy acrylate.

3. Ink Additive Package

The third component of the ink is the additive package. An EC flexo ink may optionally further comprise one or more optional additional components such as, for example, a wetting agent, a wax, talc, a surfactant, a rheology modifier, a silica, a silicone, a disbursing agent, a deaerator, or combinations thereof.

Suitable wetting agents can include, for example, polysiloxanes, polyacrylics, linear and branched polyalkoxyalate compounds, or combinations thereof, which when present are in amounts of, for example, from about 0.25 weight percent to about 2 weight percent, and preferably from about 0.5 weight percent to about 1 weight percent.

Suitable waxes can include, for example, polyethylene waxes, polyamide waxes, PTFE waxes, carnauba waxes, or combinations thereof, which when present are in amounts of from about 0.1 weight percent to about 1 weight percent, and preferably from about 0.25 weight percent to about 0.5 weight percent. Suitable talcs can include, for example, those with median particle size of from about 0.8 to about 2.4 microns, which when present are in amounts of from about 0 weight percent to about 2 weight percent, and preferably from about 0.5 weight percent to about 1 weight percent.

Suitable surfactants can include, for example, amphoteric surfactants such as an alkoxylated compound, a pyrrolidone compound, a polyacrylic polymer, or combinations thereof, which when present are in amounts of from about 0.5 weight percent to about 3 weight percent, and preferably from about 0.2 weight percent to about 1 weight percent.

Suitable silicas can include, for example, fumed silica or amorphous silica gels, with surface area of from about 50 to about 800 m.sup.2/g, which when present are in amounts of from about 0.5 weight percent to about 3 weight percent, and preferably from about 0.5 weight percent to about 2 weight percent.

Suitable silicones can include, for example, polysiloxanes and their derivatives, which when present are in amounts of from about 0.2 weight percent to about 2 weight percent, and preferably from about 0.2 weight percent to about 1 weight percent.

Suitable disbursing agents can include, for example, propylene and ethylene oxide polymeric derivatives, polysiloxane compounds, styrene-maleic anhydride and acrylic resins, which when present are in amounts of from about 0.5 weight percent to about 10 weight percent, and preferably, for example, from about 0.5 weight percent to about 3 weight percent.

Suitable deaerators can include, for example, polysiloxane derivatives, and polyalkoxylates, which when present are in amounts of from about 0.1 weight percent to about 0.7 weight percent, and preferably from, for example, about 0.1 weight percent to about 0.4 weight percent.

4. Polymerization Photoinitiator

A fourth component relates to a formula's initiation of photo-polymerization. Unless the composition is formulated specifically for use with electron beam curing, the energy curable composition will typically contain an addition polymerization photoinitiator that generates free radicals upon exposure to actinic radiation, such as ultraviolet light. Such a photoinitiator has one or more compounds that directly furnish free radicals when activated by actinic radiation. The photoinitiator may also contain a sensitizer that extends the spectral response into the near ultraviolet, visible or near infrared spectral regions. In free radical initiated curing systems, typically irradiation of a photoinitiator produces free radicals that initiate polymerization and/or crosslinking. Typically, only small amounts of photoinitiator are required to effectively initiate a polymerization, e.g. from about 0.5 wt. % to about 10 wt. % based on the total weight of the polymerizable (curable) solution. Typically, the photoinitiator is readily soluble in at least one of the major components of the energy curable solution. Typically a free-radical polymerization inhibitor is also used with these materials to prevent pre-polymerization of the ink/coating in the container during storage. Typical materials that can be used for this purpose are listed in the book "A Compilation of Photoinitators Commercially Available for UV Today," Dr. Kurt Dietliker, Ciba Specialty Chemicals, PLC, 2002 SITA Technology Limited, London-Edinburgh UK; ISBN #947798676. Newer materials that have come on the market since that book was printed and that are of particular interest for inks/coatings intended for use in food packaging can also be found, for example, in the "Swiss Ordinance on Materials and Articles in Contact with Food," (S.R. 817.023.21).

EXAMPLES

Example 1

EC Flexo Ink Press Trial "A"

Three UV Flexo Inks were formulated for wet trapping trials on a Kopack flexo press utilizing a central impression drum. The formulation of these inks was:
Yellow A:
16.0% Yellow Pigment; selected from the First Component list above.
68.55% Oligomers, Monomers and Resins; selected from the 'Second Component' list above.
4.55% Additives; selected from the 'Third Component' list above.
10.9% Photoinitiators & Inhibitors; selected from the 'Fourth Component' list above.
Magenta A:
22.0% Magenta Pigment; selected from 'First Component' list above.
61.0% Oligomers, Monomers and Resins; selected from the 'Second Component' list above.
3.55% Additives; selected from the 'Third Component' list above.
13.45% Photoinitiators & Inhibitors; selected from the 'Fourth Component' list above.
Cyan A:
24.0% Cyan Pigment; selected from 'First Component' list above.
61.4% Oligomers, Monomers and Resins; selected from the 'Second Component' list above.
0.6% Additives; selected from the 'Third Component' list above.
14.0% Photoinitiators & Inhibitors; selected from the 'Fourth Component' list above.

The rheology of each of these inks was measured using oscillatory methods with an AR-1000 rheometer (TA Instruments) utilizing a 2° cone and plate geometry. The resulting measurements were as follows.

| Name of Ink: Yellow A | | | | |
| --- | --- | --- | --- | --- |
| osc. stress (Pa) | strain | delta (degrees) | G' (Pa) | G" (Pa) |
| 0.5968 | 0.034363 | 61.05 | 8.788 | 15.89 |
| 0.5968 | 0.033878 | 60.76 | 8.993 | 16.07 |
| 0.5968 | 0.033427 | 60.46 | 9.2 | 16.23 |
| 0.5968 | 0.032918 | 60.18 | 9.421 | 16.44 |
| 0.5968 | 0.032476 | 59.96 | 9.61 | 16.62 |
| 0.5968 | 0.032064 | 59.63 | 9.83 | 16.78 |
| 0.5968 | 0.031635 | 59.4 | 10.03 | 16.96 |
| 0.5968 | 0.031265 | 59.09 | 10.24 | 17.11 |
| 0.5968 | 0.030836 | 58.9 | 10.44 | 17.3 |
| 0.5968 | 0.030496 | 58.66 | 10.63 | 17.45 |
| 0.5968 | 0.030136 | 58.4 | 10.83 | 17.61 |
| 0.6351 | 0.031444 | 58.05 | 11.15 | 17.88 |
| 1.025 | 0.049884 | 58.23 | 11.27 | 18.2 |
| 1.651 | 0.080216 | 58.94 | 11.06 | 18.36 |
| 2.568 | 0.12596 | 60.43 | 10.46 | 18.44 |
| 4.027 | 0.20154 | 62.8 | 9.473 | 18.43 |

-continued

Name of Ink: Yellow A

| osc. stress (Pa) | strain | delta (degrees) | G' (Pa) | G" (Pa) |
|---|---|---|---|---|
| 6.353 | 0.31912 | 65.35 | 8.582 | 18.7 |
| 9.637 | 0.5158 | 69.89 | 6.607 | 18.04 |
| 15.64 | 0.82015 | 72.99 | 5.706 | 18.65 |
| 25.2 | 1.3083 | 76.21 | 4.672 | 19.04 |
| 38.97 | 2.0698 | 79.3 | 3.541 | 18.74 |

Name of Ink: Rubine A (Magenta A)

| osc. stress (Pa) | strain | delta (degrees) | G' (Pa) | G" (Pa) |
|---|---|---|---|---|
| 0.5968 | 0.03005 | 65.04 | 8.669 | 18.62 |
| 0.5968 | 0.029997 | 65.01 | 8.693 | 18.65 |
| 0.5968 | 0.029917 | 64.98 | 8.726 | 18.69 |
| 0.5968 | 0.029777 | 64.99 | 8.76 | 18.78 |
| 0.5968 | 0.029636 | 64.98 | 8.805 | 18.87 |
| 0.5968 | 0.029517 | 64.94 | 8.853 | 18.93 |
| 0.5968 | 0.029412 | 64.97 | 8.872 | 19 |
| 0.5968 | 0.02936 | 64.94 | 8.899 | 19.03 |
| 0.5968 | 0.029336 | 64.92 | 8.912 | 19.05 |
| 0.5968 | 0.029266 | 64.89 | 8.943 | 19.09 |
| 0.5968 | 0.0292 | 64.9 | 8.962 | 19.13 |
| 0.6492 | 0.031596 | 64.93 | 8.995 | 19.23 |
| 1.037 | 0.050536 | 65.09 | 8.927 | 19.22 |
| 1.634 | 0.079741 | 65.53 | 8.763 | 19.25 |
| 2.551 | 0.12615 | 66.44 | 8.335 | 19.12 |
| 3.93 | 0.20037 | 68.09 | 7.538 | 18.74 |
| 5.927 | 0.31838 | 70.54 | 6.372 | 18.03 |
| 8.862 | 0.50668 | 73.5 | 5.086 | 17.17 |
| 13.39 | 0.80699 | 76.49 | 3.952 | 16.45 |
| 20.6 | 1.2791 | 79.07 | 3.099 | 16.04 |
| 32.44 | 2.003 | 81.28 | 2.48 | 16.17 |

Name of Ink: Cyan A

| osc. stress (Pa) | strain | delta (degrees) | G' (Pa) | G" (Pa) |
|---|---|---|---|---|
| 0.5968 | 0.053413 | 62.38 | 5.509 | 10.53 |
| 0.5968 | 0.053575 | 62.33 | 5.503 | 10.5 |
| 0.5968 | 0.053499 | 62.28 | 5.52 | 10.51 |
| 0.5968 | 0.05341 | 62.28 | 5.528 | 10.52 |
| 0.5968 | 0.053229 | 62.25 | 5.554 | 10.55 |
| 0.5968 | 0.052862 | 62.26 | 5.588 | 10.63 |
| 0.5968 | 0.052827 | 62.22 | 5.599 | 10.63 |
| 0.5968 | 0.052716 | 62.21 | 5.613 | 10.65 |
| 0.5968 | 0.052714 | 62.14 | 5.626 | 10.64 |
| 0.5968 | 0.05276 | 62.13 | 5.624 | 10.64 |
| 0.5968 | 0.052596 | 62.1 | 5.647 | 10.66 |
| 0.5968 | 0.052693 | 62.05 | 5.646 | 10.64 |
| 0.5968 | 0.052745 | 62.02 | 5.648 | 10.63 |
| 0.9022 | 0.079663 | 62.45 | 5.565 | 10.67 |
| 1.43 | 0.12726 | 63.52 | 5.311 | 10.66 |
| 2.217 | 0.20024 | 65.38 | 4.872 | 10.63 |
| 3.509 | 0.31994 | 68.05 | 4.299 | 10.67 |
| 5.575 | 0.50324 | 71.06 | 3.74 | 10.9 |
| 9.281 | 0.79255 | 73.77 | 3.376 | 11.6 |
| 15.91 | 1.2536 | 76.37 | 3.06 | 12.62 |
| 26.67 | 2.0154 | 79.34 | 2.485 | 13.21 |

This data can be represented graphically across the strain range of interest by plotting G' (elastic modulus) v. increasing Strain by plotting the data from the last data point having <10% strain to the first data point having >65% strain. When this is done, the resulting plot is as shown in FIG. 1.

In exemplary embodiments of the present invention, the individual data points can be connected by means of a polynomial trend line which statistically represents each of these curves very well ($R^2$ value>0.99 for all curves). Exemplary equations can be developed by commonly available statistical analysis programs, such as, for example, Microsoft Excel, and can be, for example:

$$G'_{(Cyan)} = 4.5041S^2 - 7.0054S + 6.1035; R^2 = 0.9995$$

$$G'_{(Rubine)} = 6.869S^2 - 12.775S + 9.7873; R^2 = 0.9995$$

$$G'_{(Yellow)} = 8.3586S^2 - 14.83S + 12.209; R^2 = 0.9954$$

where S=the strain value and G' is the storage (elastic) modulus.

The color trapping order for this Example 1 trial was 1st Down=Yellow A, 2nd Down=Rubine A and 3rd Down=Cyan A.

As can be seen in FIG. 1, none of the G' curves cross each other, as can be determined graphically or numerically. In exemplary embodiments of the present invention, in order to obtain a numerical estimate as to how close the lines get to each other at any specific strain value, the equations presented above can be used, for example, to calculate the difference in G' value between the ink and the ink trapped over it for any desired value of Strain. When this is done, it can be seen that this data represents a case where the difference in G' is >0.9 in the correct direction for every Strain value of interest between 10% and 65%, as shown in Table 1A below.

TABLE 1A

| 1st down Predicted G'-Yellow (Pa) | 2nd down Predicted G'-Rubine (Pa) | #1 – #2 Delta (Pa) | Strain (%) | 2nd down Predicted G'-Rubine (Pa) | 3rd down Predicted G'-Cyan (Pa) | #2 – #3 Delta (Pa) |
|---|---|---|---|---|---|---|
| 11.49 | 9.17 | 2.32 | 5% | 9.17 | 5.76 | 3.40 |
| 10.81 | 8.58 | 2.23 | 10% | 8.58 | 5.45 | 3.13 |
| 10.17 | 8.03 | 2.15 | 15% | 8.03 | 5.15 | 2.87 |
| 9.58 | 7.51 | 2.07 | 20% | 7.51 | 4.88 | 2.62 |
| 9.02 | 7.02 | 2.00 | 25% | 7.02 | 4.63 | 2.39 |
| 8.51 | 6.57 | 1.94 | 30% | 6.57 | 4.41 | 2.17 |
| 8.04 | 6.16 | 1.88 | 35% | 6.16 | 4.20 | 1.95 |
| 7.61 | 5.78 | 1.84 | 40% | 5.78 | 4.02 | 1.75 |
| 7.23 | 5.43 | 1.80 | 45% | 5.43 | 3.86 | 1.57 |
| 6.88 | 5.12 | 1.77 | 50% | 5.12 | 3.73 | 1.39 |
| 6.58 | 4.84 | 1.74 | 55% | 4.84 | 3.61 | 1.23 |
| 6.32 | 4.60 | 1.72 | 60% | 4.60 | 3.52 | 1.07 |
| 6.10 | 4.39 | 1.72 | 65% | 4.39 | 3.45 | 0.93 |
| 5.92 | 4.21 | 1.71 | 70% | 4.21 | 3.41 | 0.80 |
| 5.79 | 4.07 | 1.72 | 75% | 4.07 | 3.38 | 0.69 |
| 5.69 | 3.96 | 1.73 | 80% | 3.96 | 3.38 | 0.58 |
| 5.64 | 3.89 | 1.75 | 85% | 3.89 | 3.40 | 0.49 |
| 5.63 | 3.85 | 1.78 | 90% | 3.85 | 3.45 | 0.41 |
| 5.66 | 3.85 | 1.81 | 95% | 3.85 | 3.51 | 0.34 |
| 5.74 | 3.88 | 1.86 | 100% | 3.88 | 3.60 | 0.28 |

The printing trial on the Kopack CI (central impression) press resulted in excellent trapping of the inks with no indication of trapping problems as the run progressed for longer periods of time. Color separations for the process printing work were made on a 133 lines per inch basis. The specifics of the printing conditions relative to ink fountain tooling were as follows:

TABLE 1B

| Color | Printed Density | Anilox Screen (lines per inch) | Anilox Volume (bcm) |
|---|---|---|---|
| Yellow | 0.96 | 1000 | 1.1 |
| Magenta | 1.75 | 1000 | 1.1 |
| Cyan | 1.25 | 1000 | 1.7 |

Dot gain values for the traps were within commercial tolerances, bearing in mind that the density of the Magenta exceeded typical commercial levels by approximately 0.3 units:

TABLE 1C

| | Screen Value | | |
|---|---|---|---|
| | 25% | 50% | 75% |
| | | Dot Gain (%) at Various Values | |
| Yellow | 20 | 12 | 5 |
| Magenta | 41 | 43 | 24 |
| Cyan | 20 | 26 | 17 |

The overall trap value for a triple trap of Cyan over Magenta over Yellow was 67%.

Several things should be noted from Example 1: (i) the Cyan A over Rubine A trap was superior to the Rubine A over Yellow A trap; (ii) the difference in G' values of Cyan A over Rubine A from 5% to 35% Strain exceeds that of the difference in the G' values for Magenta A over Yellow A over the same range of Strain; and (iii) the difference in G' values of Magenta A over Yellow A exceeds those of Cyan A over Rubine A in the Strain range>40%. From this data it can be appreciated that the difference in G' values at the lower end of the Strain range of 10% to 65% is the more important factor to consider in terms of performance.

Example 2

EC Flexo Ink Press Trial "B"

Three additional UV Flexo Inks were formulated for wet trapping trials on a Kopack flexo press utilizing a central impression drum. The formulation of these inks was as follows:
Yellow B:
16.0% Yellow Pigment; selected from 'First Component' list above.
61.83% Oligomers, Monomers and Resins; selected from the 'Second Component' list above.
6.17% Additives; selected from the 'Third Component' list above.
16.0% Photoinitiators & Inhibitors; selected from the 'Fourth Component' list above.
Magenta B:
22.38% Magenta Pigment; selected from 'First Component' list above.
58.54% Oligomers, Monomers and Resins; selected from the 'Second Component' list above.
8.51% Additives; selected from the 'Third Component' list above.
10.57% Photoinitiators & Inhibitors; selected from the 'Fourth Component' list above.
Cyan B:
21.82% Cyan Pigment; selected from 'First Component' list above.
57.43% Oligomers, Monomers and Resins; selected from the 'Second Component' list above.
1.45% Additives; selected from the 'Third Component' list above.
19.3% Photoinitiators & Inhibitors; selected from the 'Fourth Component' list above.

As described regarding Example 1 above, the rheology of each of the inks was measured using oscillatory methods with an AR-1000 rheometer (TA Instruments) utilizing a 2° cone and plate geometry. The resulting measurements are recorded as follows.

| Yellow B: R3505-136 | | | | |
|---|---|---|---|---|
| osc. stress (Pa) | strain | delta (degrees) | G' (Pa) | G" (Pa) |
| 0.5968 | 1.32E−02 | 62.07 | 21.56 | 40.66 |
| 0.5968 | 1.29E−02 | 61.61 | 22.43 | 41.49 |
| 0.5968 | 1.26E−02 | 61.21 | 23.24 | 42.3 |
| 0.5968 | 1.23E−02 | 60.81 | 24.1 | 43.14 |
| 0.5968 | 1.20E−02 | 60.43 | 24.93 | 43.93 |
| 0.5968 | 1.18E−02 | 60.06 | 25.76 | 44.73 |
| 0.5968 | 1.15E−02 | 59.69 | 26.56 | 45.42 |
| 0.5968 | 1.15E−02 | 59.71 | 26.55 | 45.45 |
| 0.5968 | 1.12E−02 | 59.26 | 27.6 | 46.41 |
| 0.7053 | 0.012437 | 58.14 | 30.41 | 48.93 |
| 1.184 | 0.019734 | 57.58 | 32.67 | 51.43 |
| 1.96 | 0.031336 | 57.28 | 34.31 | 53.39 |
| 3.183 | 0.049843 | 57.41 | 34.89 | 54.57 |
| 5.081 | 0.079335 | 58.01 | 34.4 | 55.09 |
| 7.964 | 0.12694 | 59.23 | 32.53 | 54.65 |
| 11.84 | 0.20232 | 61.63 | 28.19 | 52.22 |
| 17.05 | 0.32671 | 65.25 | 22.13 | 48.02 |
| 25.95 | 0.50289 | 67.32 | 20.14 | 48.2 |
| 34.08 | 0.84017 | 74.14 | 11.2 | 39.44 |
| 49.86 | 1.3192 | 77.59 | 8.195 | 37.23 |
| 71.14 | 2.0794 | 80.77 | 5.522 | 33.99 |

| Magenta B: R3505-120 | | | | |
|---|---|---|---|---|
| osc. stress (Pa) | strain | delta (degrees) | G' (Pa) | G" (Pa) |
| 0.5968 | 8.74E−03 | 57.96 | 36.7 | 58.64 |
| 0.5968 | 8.71E−03 | 57.92 | 36.89 | 58.85 |
| 0.5968 | 8.66E−03 | 57.91 | 37.09 | 59.14 |
| 0.5968 | 8.63E−03 | 57.89 | 37.24 | 59.34 |
| 0.5968 | 8.61E−03 | 57.85 | 37.37 | 59.44 |
| 0.5968 | 8.58E−03 | 57.81 | 37.52 | 59.6 |
| 0.5968 | 8.56E−03 | 57.83 | 37.6 | 59.77 |
| 0.5968 | 8.53E−03 | 57.79 | 37.79 | 59.97 |
| 0.5968 | 8.50E−03 | 57.8 | 37.91 | 60.19 |
| 0.9148 | 0.012563 | 57.86 | 39.22 | 62.42 |
| 1.503 | 0.019962 | 57.9 | 40.48 | 64.54 |
| 2.45 | 0.03165 | 58.09 | 41.39 | 66.47 |
| 3.892 | 0.050498 | 58.51 | 40.72 | 66.47 |
| 6.033 | 0.079687 | 59.48 | 38.88 | 65.96 |
| 9.297 | 0.12654 | 61.36 | 35.6 | 65.2 |
| 13.91 | 0.2002 | 64.4 | 30.34 | 63.32 |
| 20.46 | 0.31789 | 68.35 | 23.97 | 60.4 |
| 30.23 | 0.50609 | 72.45 | 18.16 | 57.43 |
| 45.6 | 0.80374 | 76 | 13.81 | 55.41 |
| 70.45 | 1.2737 | 78.85 | 10.75 | 54.55 |
| 110.1 | 2.0117 | 81.26 | 8.347 | 54.31 |

| Cyan B: R3505-155 | | | | |
|---|---|---|---|---|
| osc. stress (Pa) | strain | delta (degrees) | G' (Pa) | G" (Pa) |
| 0.5968 | 0.026721 | 64.26 | 10.01 | 20.76 |
| 0.5968 | 0.026301 | 64.1 | 10.22 | 21.05 |
| 0.5968 | 0.026004 | 63.93 | 10.4 | 21.26 |
| 0.5968 | 0.025668 | 63.73 | 10.61 | 21.5 |
| 0.5968 | 0.02538 | 63.57 | 10.79 | 21.71 |
| 0.5968 | 0.025091 | 63.41 | 10.97 | 21.93 |
| 0.5968 | 0.024812 | 63.26 | 11.16 | 22.14 |
| 0.5968 | 0.024582 | 63.14 | 11.31 | 22.32 |
| 0.5968 | 0.024366 | 62.99 | 11.46 | 22.49 |
| 0.5968 | 0.024138 | 62.85 | 11.63 | 22.67 |

-continued

| Cyan B: R3505-155 | | | | |
|---|---|---|---|---|
| osc. stress (Pa) | strain | delta (degrees) | G' (Pa) | G" (Pa) |
| 0.5968 | 0.02395 | 62.69 | 11.78 | 22.82 |
| 0.7863 | 0.03149 | 62.49 | 11.89 | 22.82 |
| 1.246 | 0.050001 | 62.64 | 11.8 | 22.8 |
| 1.992 | 0.080308 | 63.21 | 11.52 | 22.81 |
| 3.061 | 0.12644 | 64.25 | 10.83 | 22.44 |
| 4.709 | 0.20189 | 65.65 | 9.894 | 21.86 |
| 7.058 | 0.32064 | 67.64 | 8.605 | 20.92 |
| 11.02 | 0.50113 | 69.02 | 8.074 | 21.06 |
| 16.83 | 0.81635 | 72.66 | 6.279 | 20.11 |
| 26.19 | 1.2892 | 75.95 | 5.017 | 20.05 |
| 40.15 | 2.0105 | 79.15 | 3.806 | 19.86 |

This data can be plotted in the same manner as was done for Example 1, as is shown in FIG. 2. Additionally, as above, the plotted points can be connected by means of a polynomial trend line statistically representing each of these curves. Exemplary equations for such trend lines can be:

$$G'_{(Cyan)} = 6.2527S^2 - 12.348S + 12.284; R^2 = 0.9805$$

$$G'_{(Rubine)} = 52.151S^2 - 80.153S + 44.705; R^2 = 0.9807$$

$$G'_{(Yellow)} = 22.08S^2 - 49.932S + 37.907; R^2 = 0.9979$$

where S=the strain value and G' is the storage (elastic) modulus.

The trap order used in Example 2 was 1st Down=Yellow B, 2nd Down=Rubine B and 3rd Down=Cyan B, just as in Example 1.

As can be seen from FIG. 2, the inks should barely trap in the range of Strain values from approximately 35% to 65%; but below that point the G' values are actually reversed from what would be expected for a good trap, and Magenta B ink has a higher G' value than does Yellow B in that range. Again, this can be numerically investigated by using the equations to calculate the difference in G' value between an ink and another ink trapped over it for any desired value of Strain.

| 1st Down Predicted G' Yellow (Pa) | 2nd Down Predicted G' Magenta (Pa) | #1 – #2 Delta (Pa) | Strain (%) | 2nd Down Predicted G' Magenta (Pa) | 3rd Down Predicted G' Cyan (Pa) | #2 – #3 Delta (Pa) |
|---|---|---|---|---|---|---|
| 35.47 | 40.83 | −5.36 | 5% | 40.83 | 11.68 | 29.15 |
| 33.13 | 37.21 | −4.08 | 10% | 37.21 | 11.11 | 26.10 |
| 30.91 | 33.86 | −2.94 | 15% | 33.86 | 10.57 | 23.28 |
| 28.80 | 30.76 | −1.96 | 20% | 30.76 | 10.06 | 20.70 |
| 26.80 | 27.93 | −1.12 | 25% | 27.93 | 9.59 | 18.34 |
| 24.91 | 25.35 | −0.44 | 30% | 25.35 | 9.14 | 16.21 |
| 23.14 | 23.04 | 0.10 | 35% | 23.04 | 8.73 | 14.31 |
| 21.47 | 20.99 | 0.48 | 40% | 20.99 | 8.35 | 12.64 |
| 19.91 | 19.20 | 0.71 | 45% | 19.20 | 7.99 | 11.20 |
| 18.46 | 17.67 | 0.79 | 50% | 17.67 | 7.67 | 9.99 |
| 17.12 | 16.40 | 0.73 | 55% | 16.40 | 7.38 | 9.01 |
| 15.90 | 15.39 | 0.51 | 60% | 15.39 | 7.13 | 8.26 |
| 14.78 | 14.64 | 0.14 | 65% | 14.64 | 6.90 | 7.74 |
| 13.77 | 14.15 | −0.38 | 70% | 14.15 | 6.70 | 7.45 |
| 12.88 | 13.93 | −1.05 | 75% | 13.93 | 6.54 | 7.39 |
| 12.09 | 13.96 | −1.87 | 80% | 13.96 | 6.41 | 7.55 |
| 11.42 | 14.25 | −2.84 | 85% | 14.25 | 6.31 | 7.95 |
| 10.85 | 14.81 | −3.96 | 90% | 14.81 | 6.24 | 8.57 |
| 10.40 | 15.63 | −5.23 | 95% | 15.63 | 6.20 | 9.43 |
| 10.06 | 16.70 | −6.65 | 100% | 16.70 | 6.19 | 10.51 |

This trial started out with a successful trap of the magenta over the yellow (surprising, given FIG. 2), and of the cyan over the magenta (not surprising, given FIG. 2). However, after several minutes and several thousand feet of stock had been run through the press, the yellow began back-trapping onto the magenta roller. All colors were run with Harper ceramic anilox rollers with a screen count of 800 lines per inch and cell volume of 1.8 bcm. Color separations for the process printing work were made on a 150 lines per inch basis. They were printed onto a polyethylene bag film and only the UV lamp in the final station was turned on, so wet trapping was being used in every station. The results in terms of trap densities were:

Anilox 800 1.8 BCM
Curing at the end with one WPI bulb.

| Speed | Colors | Density | Trap Density |
|---|---|---|---|
| 100 FPM | Process Yellow | 0.45 | Orange 1.25 |
| | Process Magenta | 0.39 | Green 1.32 |
| | Process Cyan | 0.99 | Purple 1.50 |
| 200 FPM | Process Yellow | 0.43 | Orange 1.18 |
| | Process Magenta | 0.40 | Green 1.24 |
| | Process Cyan | 0.75 | Purple 1.40 |
| 300 FPM | Process Yellow | 0.89 | Orange 1.09 |
| | Process Magenta | 0.42 | Green 1.21 |
| | Process Cyan | 0.48 | Purple 1.48 |

Four color process printing with full UV curing (dry trapping) Anilox 800 LPI 1.8 BCM

| Speed | Colors | Density | Trap Density |
|---|---|---|---|
| 300 FPM | Process Yellow | 0.50 | Orange 1.46 |
| | Process Magenta | 0.48 | Green 1.33 |
| | Process Cyan | 1.23 | Purple 1.77 |

What is not too surprising from this data is that Magenta B, being the color with the highest elastic modulus on average, showed the least difference in color density relative to speed as well as the least difference in color density between the wet vs. dry trap condition. With increasing speed (and hence increasing shear) the cyan (which is the most Newtonian of these fluids) steadily lost color transfer ability. This indicates that—contrary to the "common wisdom"—pseudo-plastic behaviour can work to a flexographic ink's advantage in maintaining printed color density under conditions of changing speeds.

With regard to the traps:
Orange wet trap density (Magenta over Yellow) varied significantly with speed; 1.25/1.18/1.09 at 100/200/300 respectively, with an average value of 1.17. (Hi Value–Lo Value)/Average=13.6%
Green wet trap density (Cyan over Yellow) stayed more stable with speed; 1.32/1.24/1.21 at 100/200/300 respectively, with an average value of 1.26. (Hi Value–Lo Value)/Average=8.75%
Purple wet trap density (Cyan over Magenta) stayed the most stable vs. speed; 1.50/1.40/1.48 at 100/200/300 respectively, with an average value of 1.46. (Hi Value–Lo Value)/Average=6.85%

Thus, the traps with the most advantageous G' relationship (i.e. the greatest amount of separation of G' between them) were also the most stable in printing performance.

Dot gains for trial "B" (Example 2) were also recorded. The dot gains were remarkably stable, demonstrating that the process works. Except for when backtrapping of the yellow into the magenta occurred at higher speed, these values demonstrate commercially acceptable performance for a wet trapping process.

Anilox 800 1.8 BCM
Curing at the end with one 300 WPI bulb.

| Colors | Dot Gain | | |
|---|---|---|---|
| | 25% | 50% | 75% |
| 100 FPM | | | |
| Process yellow | 23 | 10 | 3 |
| Process magenta | 5 | 13 | 13 |
| Process cyan | 14 | 21 | 28 |
| 200 FPM | | | |
| Process yellow | 3 | 10 | 23 |
| Process magenta | 12 | 13 | 13 |
| Process cyan | 27 | 19 | 26 |
| 300 FPM | | | |
| Process yellow | 25 | 28 | 14 |
| Process magenta | 131 | 144 | 322 |
| Process cyan | 25 | 14 | 9 |

To explain why proper wet trapping still occurred between the magenta and yellow inks, it is useful to consider the properties of pseudo-plastic fluids relative to the geometry of the Kopack press. Printing units #2, #3 and #4 were used for this test. The distance between units #2 and #3 is 42 inches and the distance between units #3 and #4 is 16 inches. They yellow was in unit #2 and the magenta in unit #3. At a speed of 100 feet per minute, this corresponds to a time of 2.1 seconds between ink impressions. At a speed of 300 feet per minute, this declines to 0.7 seconds between print impressions. Creep recovery tests were performed on the "A", "B" and "C" inks (i.e., the inks from Examples 1-3). An initial shear stress of 1500 Pa was applied. The test was run until strain recovery ceased. Compliance (J), was reported, the Equilibrium Compliance ($J_e$) being defined as the total recoverable strain normalized with the applied stress.

$$J_e = \gamma/\sigma = (\text{Recoverable Strain})/(\text{Applied Stress})$$

Due to the long times required for some colors to come to final equilibrium, the value where J equals (95%×$J_e$) was taken as the reference point where strain recovery is said to be essentially completed; and the time required to reach that point was recorded.
Creep Recovery Test, Initial Applied Stress of 1500 Pa.

| Example Ink | Color | Compliance Recovery Time at J = J(e) × 95% (Seconds) | Compliance J = J(e) × 95% (1/Pa) |
|---|---|---|---|
| A | Yellow | 0.090 | −0.0175 |
| A | Magenta | 0.147 | −0.0510 |
| A | Cyan | 0.250 | −0.1431 |
| B | Yellow | 0.056 | −0.0080 |
| B | Magenta | 0.042 | −0.0049 |
| B | Cyan | 0.163 | −0.0648 |
| C | Yellow | 0.102 | −0.0243 |
| C | Magenta | 0.080 | −0.0196 |
| C | Cyan | 0.179 | −0.0872 |

What should be noted about these 95% recovery time values, is how short they are vs. the amount of time required for the substrate to pass between the print units of the Kopack as mentioned previously. Therefore, each of the inks has sufficient time to recover essentially all of its original body characteristics between the printing units at the speeds indicated above. This means that the G' curves, which are constructed by starting near zero strain on an unstressed ink and then increasing the strain in steps, are indeed valid for analyzing trapping under dynamic press conditions.

Although there is little separation in the G' values between the "B" yellow and the "B" magenta, if the magenta and yellow see more strain than 30% as they trap the yellow will not back trap into the magenta. (30% strain correlates to a dot gain of approximately 18.) Obviously if the magenta sees less strain than this, then the G' relationship is not favorable and back-trapping will occur. Since the gain of the 50% dot of the magenta at slower speeds was approximately 13 correlating to a theoretical strain level of approximately 23% it may be assumed that a favorable relationship of the G' values was not achieved and back-trapping occurred. However, it is not necessarily accurate to assume that the yellow also experienced exactly 23% strain as the magenta was being trapped on top of it. It may actually have experienced somewhat less, since it was physically further away from the surface of the plate at the point of impression than was the magenta. At a strain of 23% the magenta would have a G' value around 29 Pa. The yellow has an identical G' value at a strain of around 19%. Therefore, if the strain forced onto the yellow by the action of transferring the magenta to it is less than 19%; there is a possibility that the inks will still trap. In the actual case the inks did not trap very well over an extended time, but initially they did wet trap successfully.

Careful consideration of this mechanism explains the tendency of press operators to manipulate plate to substrate impression pressure when back-trapping occurs. In cases where the relationship of the G' values between two inks is not optimum, (i.e. the inks are not separated at all points along the G' v. Strain curve with no crossing points), if the separation becomes greater in the desired direction with greater shear, then increasing impression pressure can make back-trapping disappear. Conversely, if the increase in pressure makes the G' relationship of the inks less advantageous, back-trapping will increase. The complex relationship between impression pressure and the actual strain imparted to the first down ink makes control of this technique challenging.

Manipulation of the printing impression pressure can enable trapping to occur in practice, even with a sub-optimum set of inks. This is thus a useful result. It may mean in practice that a set of inks considered "borderline for trapping" based on their G' characteristics can be "forced" to print a trap successfully. However, the well known problems that occur when printing in an overimpressed condition (hard edges on solids, donuts, halos, etc.) or in an underimpressed conditions (missing print, uneven density of solids, etc.) make this a less desirable condition than choosing inks with the correct G' separation and printing them at normal impression pressures.

Example 3

EC Flexo Ink Press Trial "C"

The example inks used in Trial "B" were mixed with a thickening compound to manipulate the G' of the inks, and the trial was run again.
R3505-136
Thickened_Yellow
50% R3505-136 (Ink "B")
45% UV Flexo Extender
5% Fumed Silica
R3505-120
Thickened_Magenta
50% R3505-120 (Ink "B")
45% UV Flexo Extender
5% Fumed Silica

R3505-155

Thickened_Cyan

50% R3505-155 (Ink "B")

45% UV Flexo Extender

5% Fumed Silica

Name of Ink: UV Flexo Extender 0.0% Pigment; selected from 'First Component' list above.

89.7% Oligomers, Monomers and Resins; selected from the 'Second Component' list above.

0.3% Additives; selected from the 'Third Component' list above.

10.0% Photoinitiators & Inhibitors; selected from the 'Fourth Component' list above.

The rheology of each of the inks was measured as above, the resulting measurements are recorded as follows.

| Yellow C (R3505-136_Thickened_Yellow) | | | |
|---|---|---|---|
| osc. stress (Pa) | strain | delta (degrees) | G' (Pa) | G" (Pa) |
| 0.5968 | 0.015417 | 59.03 | 20.37 | 33.94 |
| 0.5968 | 0.014981 | 58.52 | 21.27 | 34.73 |
| 0.5968 | 0.014599 | 58.12 | 22.06 | 35.48 |
| 0.5968 | 0.014204 | 57.66 | 22.97 | 36.27 |
| 0.5968 | 0.013861 | 57.27 | 23.78 | 36.99 |
| 0.5968 | 0.013548 | 56.86 | 24.59 | 37.67 |
| 0.5968 | 0.013245 | 56.53 | 25.37 | 38.37 |
| 0.5968 | 0.012965 | 56.15 | 26.17 | 39.02 |
| 0.5968 | 0.012705 | 55.84 | 26.92 | 39.66 |
| 0.6234 | 0.01243 | 54.73 | 29.53 | 41.76 |
| 0.9952 | 0.019709 | 54.16 | 30.16 | 41.75 |
| 1.604 | 0.031388 | 53.9 | 30.71 | 42.1 |
| 2.604 | 0.050507 | 54.29 | 30.68 | 42.67 |
| 4.043 | 0.079585 | 55.28 | 29.49 | 42.56 |
| 6.207 | 0.12763 | 56.9 | 27.06 | 41.52 |
| 8.941 | 0.20309 | 59.74 | 22.62 | 38.76 |
| 12.66 | 0.32872 | 63.41 | 17.57 | 35.11 |
| 19.11 | 0.49801 | 65.06 | 16.48 | 35.43 |
| 25.7 | 0.8423 | 71.59 | 9.795 | 29.43 |
| 37.72 | 1.3235 | 75.32 | 7.321 | 27.94 |
| 53.4 | 2.0852 | 79.07 | 4.906 | 25.41 |

| Magenta C (R3505-120_Thickened_Magenta) | | | | |
|---|---|---|---|---|
| osc. stress (Pa) | strain | delta (degrees) | G' (Pa) | G" (Pa) |
| 0.5968 | 3.77E-03 | 25.98 | 143.8 | 70.05 |
| 0.5968 | 3.77E-03 | 25.86 | 143.8 | 69.71 |
| 0.5968 | 3.76E-03 | 25.72 | 144.3 | 69.49 |
| 0.5968 | 3.76E-03 | 25.76 | 144.4 | 69.67 |
| 0.5968 | 3.76E-03 | 25.56 | 144.7 | 69.2 |
| 0.5968 | 3.75E-03 | 25.67 | 144.7 | 69.53 |
| 0.5968 | 3.74E-03 | 25.71 | 145.1 | 69.89 |
| 0.803 | 5.04E-03 | 25.86 | 144.8 | 70.16 |
| 1.248 | 7.99E-03 | 26.52 | 141.3 | 70.49 |
| 1.948 | 0.012664 | 27.65 | 137.6 | 72.1 |
| 3.034 | 0.020137 | 30.24 | 131.5 | 76.63 |
| 4.472 | 0.031861 | 35.95 | 114.8 | 83.22 |
| 6.268 | 0.05187 | 44.37 | 87.25 | 85.36 |
| 8.54 | 0.082949 | 49.55 | 67.52 | 79.18 |
| 11.52 | 0.12948 | 53.13 | 53.99 | 71.99 |
| 15.73 | 0.20237 | 56.89 | 42.96 | 65.88 |
| 22.4 | 0.31997 | 61.81 | 33.44 | 62.39 |
| 33.53 | 0.5107 | 66.74 | 26.19 | 60.93 |
| 55.03 | 0.80303 | 70.22 | 23.38 | 65.01 |
| 87.55 | 1.3018 | 74.21 | 18.42 | 65.13 |
| 131.8 | 2.0027 | 77.57 | 14.25 | 64.62 |

| Cyan C (R3505-155_Thickened_Cyan) | | | | |
|---|---|---|---|---|
| osc. stress (Pa) | strain | delta (degrees) | G' (Pa) | G" (Pa) |
| 0.5968 | 0.021297 | 58.31 | 15.18 | 24.6 |
| 0.5968 | 0.020928 | 58.01 | 15.58 | 24.94 |
| 0.5968 | 0.020585 | 57.64 | 16 | 25.25 |
| 0.5968 | 0.020273 | 57.34 | 16.38 | 25.55 |
| 0.5968 | 0.019963 | 57.08 | 16.75 | 25.87 |
| 0.5968 | 0.019703 | 56.81 | 17.09 | 26.13 |
| 0.5968 | 0.019469 | 56.56 | 17.41 | 26.36 |
| 0.5968 | 0.01923 | 56.3 | 17.74 | 26.61 |
| 0.5968 | 0.019008 | 56.12 | 18.03 | 26.85 |
| 0.5968 | 0.018787 | 55.93 | 18.33 | 27.1 |
| 0.6417 | 0.019855 | 55.55 | 18.83 | 27.44 |
| 1.034 | 0.031523 | 55.81 | 18.97 | 27.92 |
| 1.635 | 0.050139 | 56.46 | 18.54 | 27.97 |
| 2.506 | 0.079608 | 57.6 | 17.35 | 27.35 |
| 3.765 | 0.12742 | 59.33 | 15.51 | 26.16 |
| 5.356 | 0.2023 | 61.93 | 12.83 | 24.05 |
| 7.5 | 0.32399 | 64.93 | 10.1 | 21.59 |
| 10.67 | 0.51792 | 68.21 | 7.862 | 19.67 |
| 15.74 | 0.82019 | 71.83 | 6.13 | 18.68 |
| 23.2 | 1.2966 | 75.97 | 4.42 | 17.69 |
| 33.01 | 2.0329 | 79.96 | 2.867 | 16.2 |

This data can be represented graphically across the strain range of interest. When this is done, the resulting plot is as shown in FIG. 3.

These inks were run under the same conditions as Example 2 (Trial "B"), including being trapped in the same order: 1st Down=Yellow C, 2nd Down=Rubine C and 3rd Down=Cyan C.

The trapping failed almost immediately, much more rapidly than for Trial "B". This confirms the prediction of wet trapping. Thus, in exemplary embodiments of the present invention, the comparison of G' values between two inks intended to trap over each other can: (i) predict a good trap, as in Trial "A"; (ii) predict a borderline situation that can possibly be addressed through manipulation of the press as in Trial "B", but which is most likely a recipe for failure over a long run; and (iii) predict failure of the trap, as in Trial "C".

The data for this ink set predicts that yellow would trap over magenta, but not that magenta would trap over yellow. The polynomial equations for this set of inks, set forth below, also exhibit high statistical correlation as measured by $R^2$ values with the actual data plotted on the graph.

$G'_{(Cyan)} = 25.193S^2 - 37.15S + 19.798; R^2 = 0.992$ $G'_{(Rubine)} = 139.89S^2 - 177.7S + 76.907; R^2 = 0.964$ $G'_{(Yellow)} = 27.555S^2 - 49.827S + 32.584; R^2 = 0.987$ It can thus be seen that the statistical correlation between the trend line calculated by regression analysis of a $2^{nd}$ order polynomial and the actual data points in the region of interest from 10% to 65% strain is very good; all the way from a G' value of <4 Pa for the Cyan in "A" to a G' value of >60 Pa for the Magenta in "C".

Example 4

UV Flexo Inks "B", Bench Test of Cyan and Magenta Wet Trapping

In this example, proofs were made on Leneta Form 2A-Opacity of UV flexo inks using a Phantom Model bladed hand-proofer supplied by Harper Corporation of America, of Charlotte, N.C., USA. The circumference of the hand proofer's transfer roller measured 61 mm. The standard anilox used in the testing was a 440 line per inch cylinder with 3.35 bcm cells (unless otherwise specified). Proofs were cured on a laboratory UV curing unit with medium pressure mercury vapor lamps at a nominal exposure of:

$UV_A = 138$ mJ/cm² (millijoules per square centimeter)

$UV_B = 102$ mJ/cm²

$UV_C = 19$ mJ/cm²

To establish the coloristics of the trapping target, a dry trap of two colors was made first. The first down ink was printed with the handproofer over a mask with an aperture between 8-18 mm in width and between 20-40 mm in length. The ink was cured using the lab UV curing unit at the above conditions. The hand proofer was cleaned and ink of a second color was applied to it. The second pull was then made directly over the area where the first image had been pulled and extended at least 61 mm beyond the leading edge of the first image, an area referred to as the "ghost" trap. The proof was then passed through the UV curing unit at the above conditions for a second time.

Subsequently a wet trap of the two colors was also made. The first down ink was again printed with the handproofer over a mask with an aperture between 8-18 mm in width and between 20-40 mm in length. This time the ink was allowed to remain wet on the proofing form while the hand proofer was cleaned and ink of a second color was applied to it. The second pull was then made directly over the area where the first image had been pulled and extended at least 61 mm beyond the leading edge of the first image, the "ghost trap" area. The proof was then passed through the UV curing unit at the above conditions.

An X-Rite spectrodensitometer (Model 500) was used to evaluate the printed color on each proof. The printed color density of the region correlating in size and shape to the trap starting at a point 61 mm down line from the leading edge of the trap was evaluated. The color of this region for the dry trap was assumed to have the characteristics of a "perfect trap." This value was then compared to the measurement from the same area for the wet trap condition. The difference in printed color density of the $1^{st}$ down color was recorded. This measurement, designated $G_{(1d)}$ is effectively a measurement of the Gain in the $1^{st}$ down color in the $2^{nd}$ impression position where it is not wanted. A low value is good, a high value indicates that the wet ink "tracked" from where the roller first touched it and was redeposited onto the substrate as the roller completed its $2^{nd}$ revolution.

Referencing Example 2, the difference in G' values for the Magenta and Cyan are such that the Magenta is anywhere from 7.7 to 26.1 Pa higher than the Cyan across the range from 10% strain to 65% strain. Our prediction was that a $2^{nd}$ down Cyan would trap well over a $1^{st}$ down Magenta, but a $1^{st}$ down Cyan would back-trap into a $2^{nd}$ down Magenta and track color into the "ghost trap" area.

The measured values were:

| Color 1st Down | Color 2nd Down | "Ghost Trap" Density of the 1st Down Color in Wet Trap Mode | "Ghost Trap" Density of the 1st Down Color in Dry Trap Mode | Color Trap Gain | Visual Assessment |
|---|---|---|---|---|---|
| Cyan "B" | Magenta "B" | 0.68 | 0.42 | 0.26 | Poor |
| Magenta "B" | Cyan "B" | 0.72 | 0.69 | 0.03 | Good |

The measured values thus confirmed our prediction of trapping ability for these inks.

Example 5

UV Flexo Inks "B", Bench Test of Cyan and Yellow Wet Trapping

In this example the experimental methodology was identical to that used in Example 4. Referencing Example 2, the difference in G' values for the Yellow and Cyan are such that the Yellow is anywhere from 7.9 to 22.0 Pa higher than the Cyan across the range from 10% strain to 65% strain. Our prediction is that the a $2^{nd}$ down Cyan will trap well over a $1^{st}$ down Yellow, but that a $1^{st}$ down Cyan will back-trap into a $2^{nd}$ down Yellow and track color into the "ghost trap" area.

The measured values were:

| Color 1st Down | Color 2nd Down | "Ghost Trap" Density of the 1st Down Color in Wet Trap Mode | "Ghost Trap" Density of the 1st Down Color in Dry Trap Mode | Color Trap Gain | Visual Assessment |
|---|---|---|---|---|---|
| Cyan "B" | Yellow "B" | 0.39 | 0.09 | 0.30 | Poor |
| Yellow "B" | Cyan "B" | 0.39 | 0.34 | 0.05 | Good |
| Yellow "B" | Cyan "B" | 0.45 | 0.39 | 0.06 | Good |

The measured values again confirm the prediction of trapping ability for these inks.

Example 6

UV Flexo Inks "B", Bench Test of Magenta and Yellow Wet Trapping

Experimental methodology was identical to that used in Example 4. Referencing Example II, the difference in G' values for the Yellow and Magenta are confusing. At 10% strain the G' value for Magenta exceeds that of Yellow by 4.0 Pa, falling to where they are equal at 35% strain. After the curves cross, the Yellow continues to increase until its G' value is 0.7 Pa higher than Magenta at 50% strain. Thereafter it continues to fall until at 70% strain, its predicted value again falls below that of Magenta's. This confusing situation is important because it should both show an indeterminate result as well as showing which strain range for G' is of greatest importance in the evaluation of trapping.

The measured values were:

| Color 1st Down | Color 2nd Down | "Ghost Trap" Density of the 1st Down Color in Wet Trap Mode | "Ghost Trap" Density of the 1st Down Color in Dry Trap Mode | Color Gain | Visual Trap Assessment |
|---|---|---|---|---|---|
| Magenta "B" | Yellow "B" | 0.28 | 0.21 | 0.07 | Random Picking |
| Yellow "B" | Magenta "B" | 2.46 | 2.15 | 0.31 | Poor |

The measured values show that, overall, the $1^{st}$ down Magenta $2^{nd}$ down Yellow trap was acceptable. However, the visual assessment show that there are numerous small flecks of tracked Magenta in the "ghost trap" area; not enough to upset the reading, but enough that they are thoroughly visible. The largest are less than 0.1 mm in diameter and the distribution is fairly random across the surface of the print.

This measurement again proves that the prediction was correct. The fact that the G' vs. Strain curves crossed for the two colors meant that neither trap order was going to result in an acceptable trap. What is also interesting is that, for the most part, the $2^{nd}$ down Yellow over $1^{st}$ down Magenta was the more successful of the two; and that would correlate to the low strain region where the G' value of the Magenta is higher.

Example 7

UV Flexo Inks "B", Bench Test of Cyan Over Yellow Wet Trapping, Various Ink Film Thicknesses Experimental methodology was identical to that used in Example 4 except for anilox choice. Inks used were the "B" inks from Example 2. Various aniloxes were used to determine if the trapping was influenced by the size of the anilox. Yellow "B" was printed $1^{st}$ down, Cyan "B" $2^{nd}$ down; comparison of G' vs. Strain curves predicts trap would be good.

Measured values were:

The visual assessment of how much of the first down color tracked into the "Ghost Trap" area is a much better guide in this case than the Color Gain numbers. The eye may be capable of seeing differences in color balance that depend on color density and are difficult to develop a straightforward representation of numerically.

Wet on wet EC flexo trapping appears to work better at thicker ink films. Interestingly, the result of applying a thinner layer first and a thicker layer $2^{nd}$ did not seem to change the efficiency of the color trap very much. This tends to argue for the physical properties of the ink as being the primary factor needed to control wet-on-wet flexo trapping.

Example 8

UV Flexo Inks "B", Bench Test of Yellow Over Cyan Wet Trapping, Various Ink Film Thicknesses Experimental methodology was identical to that used in Example 4 except for anilox choice. Inks used were the "B" inks from Example 2. Various aniloxes were used to determine if the trapping was influenced by the size of the anilox. Cyan "B" was printed $1^{st}$ down, Yellow "B" $2^{nd}$ down; comparison of G' vs. Strain curves predicts trap would not work.

| 1st Down Color = Yellow "B" 2nd Down Color = Cyan "B" | | | | | |
|---|---|---|---|---|---|
| Anilox Cell Volume (bcm) 1st Down | Anilox Cell Volume (bcm) 2nd Down | "Ghost Trap" Density of the 1st Down Color in Wet Trap Mode | "Ghost Trap" Density of the 1st Down Color in Dry Trap Mode | Color Gain | Visual Tracking Assessment |
| 1.15 | 1.15 | 0.34 | 0.23 | 0.11 | Visible |
| 1.70 | 1.70 | 0.28 | 0.40 | −0.12 | Medium |
| 1.70 | 1.70 | 0.28 | 0.35 | −0.07 | Slight |
| 1.70 | 3.35 | 0.28 | 0.38 | −0.10 | Slight |
| 3.35 | 3.35 | 0.45 | 0.39 | 0.06 | Good |
| 6.41 | 6.41 | 0.38 | 0.40 | −0.02 | Good |

Measured values were:

| Anilox Cell Volume (bcm) 1st Down | Anilox Cell Volume (bcm) 2nd Down | "Ghost Trap" Density of the 1st Down Color in Wet Trap Mode | "Ghost Trap" Density of the 1st Down Color in Dry Trap Mode | Color Gain | Visual Tracking Assessment |
|---|---|---|---|---|---|
| \multicolumn{6}{c}{1st Down Color = Cyan "B"} | | | | | |
| \multicolumn{6}{c}{2nd Down Color = Yellow "B"} | | | | | |
| 1.15 | 1.15 | 0.14 | 0.13 | 0.01 | Visible |
| 1.70 | 1.70 | 0.32 | 0.10 | 0.22 | Medium |
| 3.35 | 3.35 | 2.36 | 2.09 | 0.27 | Heavy |
| 6.41 | 6.41 | 2.32 | 2.11 | 0.21 | Severe |

As in the previous example, the visual assessment of how much of the first down color tracked into the "Ghost Trap" area is a much better guide than the Color Gain numbers. The results of this example are very clear. If there is already a predicted tendency for the inks to back-trap, then the more ink you try to apply to the substrate the more will back-trap and the worse the visual assessment of tracking will be.

Example 9

Control of the G' Value of an Ink Through Formulation Changes

Materials known in the art to increase ink body, such as, for example, fumed silica, are useful for the modifying the cohesive properties of inks. These cohesive properties can be represented by G'. The Magenta B and Magenta C formulas (respectively provided in Examples 2 and 3 above) are essentially comparable except for silica content. The addition of silica compound increases the G' value for the ink anywhere from 30% to 60% across the strain range of interest, as shown in FIG. 4. FIG. 4 compares the G' vs. Strain curves for Magenta C and Magenta B using the data provided above for each of these two colors. As can be seen from FIG. 4, the G' value is increased across the entire domain of strains, but more so at the extremes.

The present invention has been described in detail, including various exemplary embodiments thereof, and various described examples thereof. However, it will be appreciated that those skilled in the art, upon consideration of the present disclosure, may make modifications and/or improvements on this invention that fall within the scope and spirit of the invention

What is claimed:

1. A method for wet trapping energy curable inks on press, comprising:
   providing a set of energy curable inks to be successively printed on a printing press;
   calculating the storage modulus G' for each ink in the set as a function of strain over a range of strains; and
   printing the energy curable inks in an order so that the value of G' for each successive ink laid down is lower than its immediately previously printed ink by at least a defined drop D over a defined range R of strain values.
2. The method of claim 1, wherein D is selected from 1.0 Pascal and 0.9 Pascal.
3. The method of claim 1, wherein R is selected from the following: from 20% through 50% strain, from 10% through 65% strain, and from 10% through 120% strain.
4. The method of claim 1, wherein the storage modulus of the ink G' is given by $$G' = \{\sigma o \cos(\delta)\}/\in o$$

Where:
σo=amplitude of the stress;
∈o=amplitude of the strain; and
δ=phase angle between them.
5. The method of claim 1, wherein said calculating the storage modulus G' for each ink in the set includes measuring the rheology of the inks using oscillatory methods.
6. The method of claim 1, further comprising changing the value of G' for one or more of the inks in said set so as to substantially satisfy the G' drop criterion over the range of interest R.
7. The method of claim 6, wherein the G' value of an ink is manipulated to move lower by at least one of the following: lowering the percentage of pigment in the ink and adding a thickening agent.
8. The method of claim 7, wherein said thickening agent is fumed silica.
9. The method of claim 6, wherein the G' value of an ink is manipulated to move higher by adding materials that impart pseudo-plastic behavior to the ink.
10. The method of claim 6, wherein the G' value of said one or more the inks is manipulated by using any combination of resins, oligomers, monomers, fillers and additives.
11. The method of claim 10, where the G' value of the ink is lowered by lowering solids levels in the ink, or using resins that exhibit less cohesive force.
12. The method claim 1, further comprising changing the value of G' for one or more of the inks in said set so as to change the order of printing of the inks.
13. The method of claim 1, wherein D ranges between 1.0 Pascal and 0.0 Pascal at some point(s) across the range of strain from 10% to 65%.
14. The method of claim 1, wherein D is negative at some points across the range of strain from 10% to 65%.
15. The method of claim 1, wherein D varies with each pair of inks in the set.
16. A method of accurately predicting successful wet trapping behavior of successively printed inks, comprising:
   calculating the storage modulus G' value for each ink as a function of strain over a range of strains;
   ensuring there is a sufficient drop in G' value between each pair of successively printed inks to ensure successful wet trapping; and
   printing the energy curable inks in an order so that an ink with a highest G' is printed first and each successive ink is printed in order of decreasing G' value.
17. The method of claim 16, wherein a 1.0 Pascal drop at every point along the G' vs. Strain curve, from a strain value of 10% to a strain value of 65% is a sufficient drop.

18. The method of claim 17, further comprising changing the G' value of the inks to achieve said sufficient drop in G' value.

19. The method of claim 18, further comprising at least one of:
 adding materials that impart pseudo-plastic behavior to energy curable inks to move G' values higher, lowering solids levels in an ink, or using resins that exhibit less cohesive force, to move G' values of inks lower, and
 testing materials or combinations of materials for their effect on G' and then adding or removing as needed in order to maintain an optimal spacing of G' values between successive colors intended to be trapped.

\* \* \* \* \*